(12) United States Patent  
Chan

(10) Patent No.: US 8,768,141 B2  
(45) Date of Patent: Jul. 1, 2014

(54) VIDEO CAMERA BAND AND SYSTEM

(71) Applicant: Eric Chan, New York, NY (US)

(72) Inventor: Eric Chan, New York, NY (US)

( * ) Notice: Subject to any disclaimer, the term of this patent is extended or adjusted under 35 U.S.C. 154(b) by 0 days.

(21) Appl. No.: 13/690,612

(22) Filed: Nov. 30, 2012

(65) Prior Publication Data

US 2013/0202274 A1     Aug. 8, 2013

Related U.S. Application Data

(60) Provisional application No. 61/610,580, filed on Mar. 14, 2012, provisional application No. 61/585,145, filed on Jan. 10, 2012, provisional application No. 61/566,400, filed on Dec. 2, 2011.

(51) Int. Cl.  
*H04N 5/76* (2006.01)

(52) U.S. Cl.  
USPC .......................................... 386/224; 386/226

(58) Field of Classification Search  
USPC ......................... 386/224, 209, 210, 223, 226  
See application file for complete search history.

(56) References Cited

U.S. PATENT DOCUMENTS 5,377,051 A * 12/1994 Lane et al. ................... 386/314  
7,016,522 B2 * 3/2006 Bani-Hashemi ............. 382/131  
8,310,555 B2 * 11/2012 Ludlow ..................... 348/211.14

* cited by examiner

*Primary Examiner* — Robert Chevalier  
(74) *Attorney, Agent, or Firm* — William E. Pelton, Esq.; Cooper & Dunham LLP

(57) ABSTRACT

A video camera band includes left and right side portions, a bridge, at least one video camera, a processor, local storage and a network interface. Video recorded by the video camera band is transmitted via the network interface to a remote computing device.

15 Claims, 55 Drawing Sheets

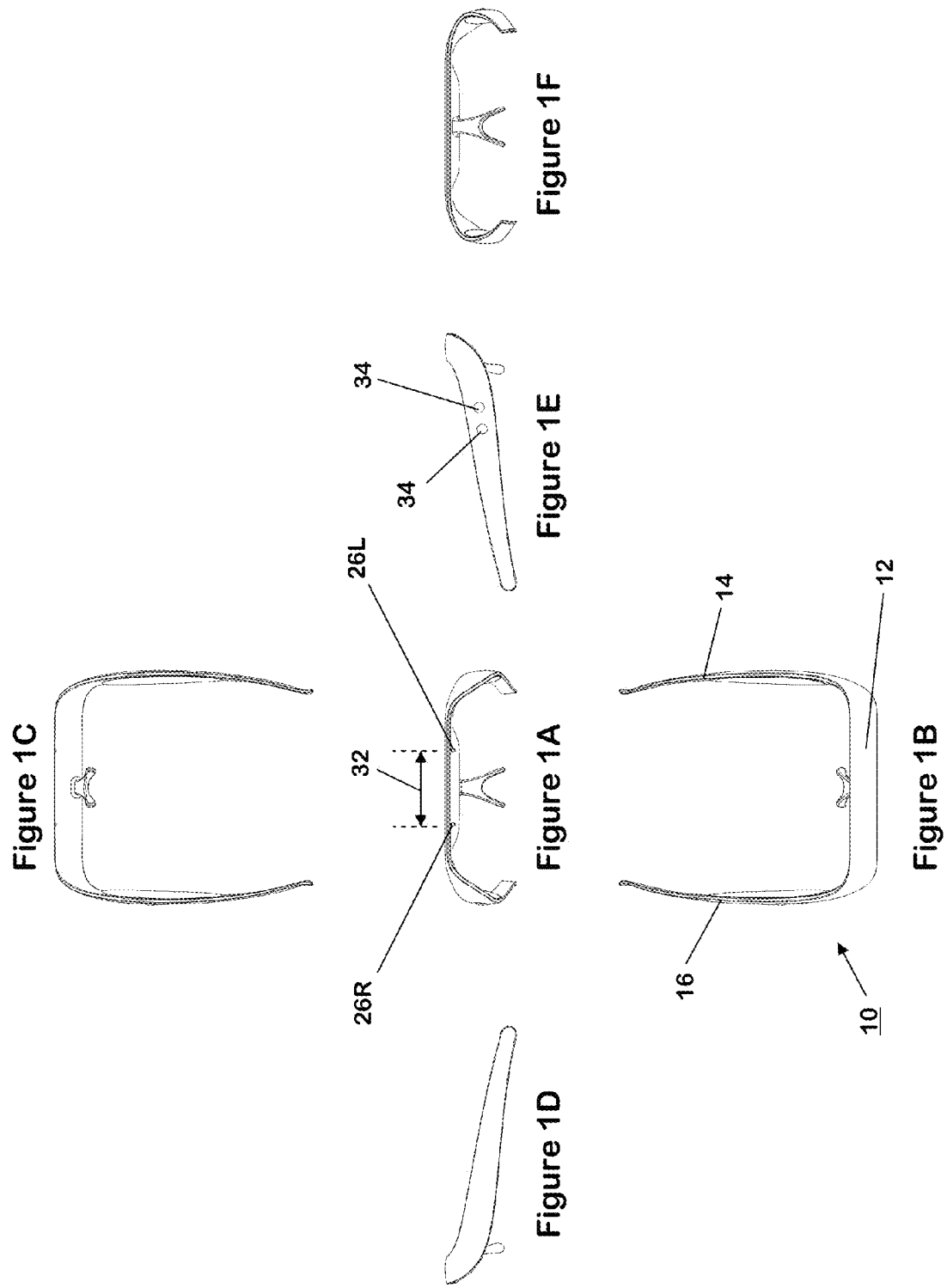

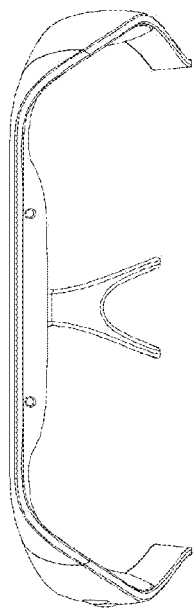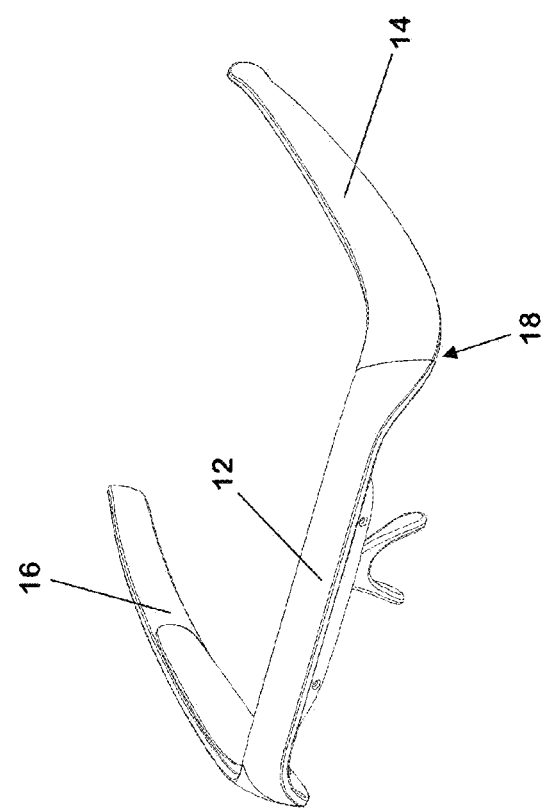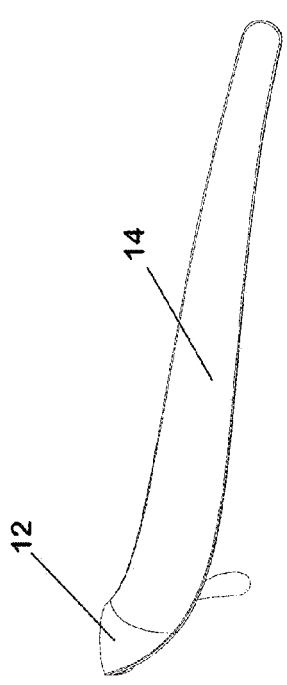
Figure 2B
Figure 2C
Figure 2A

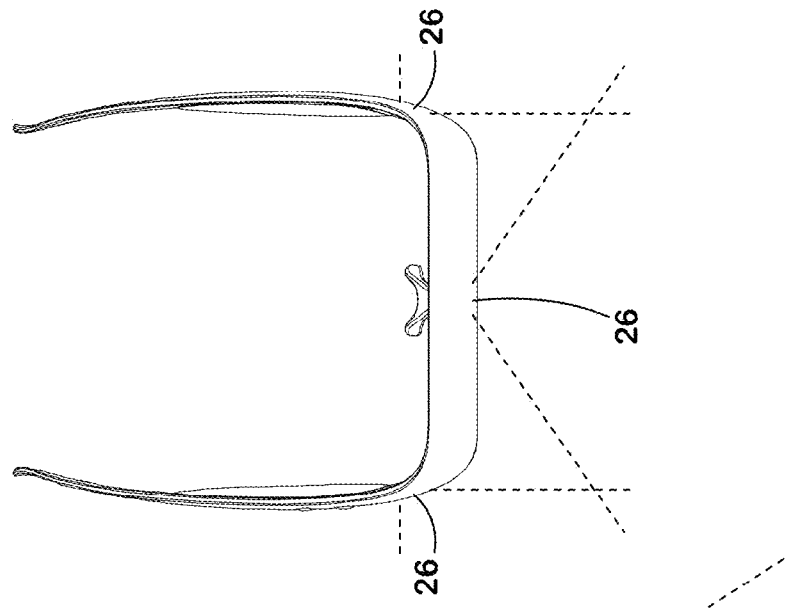
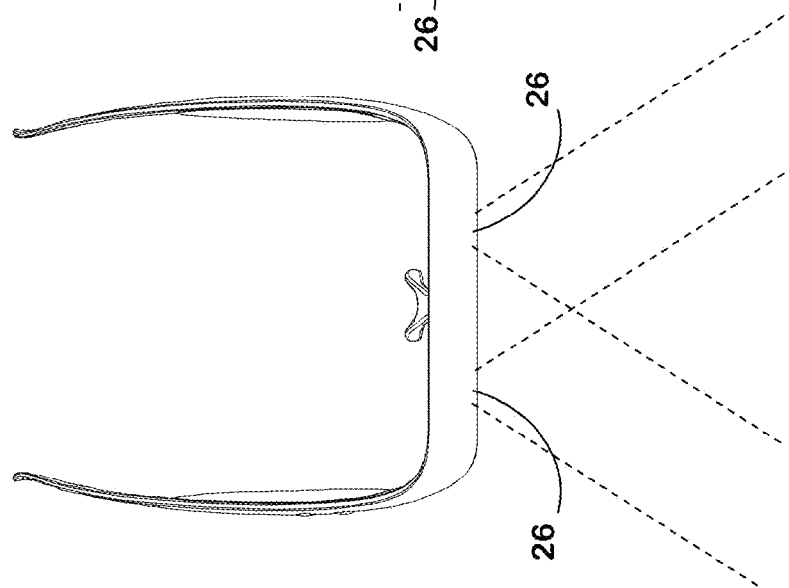
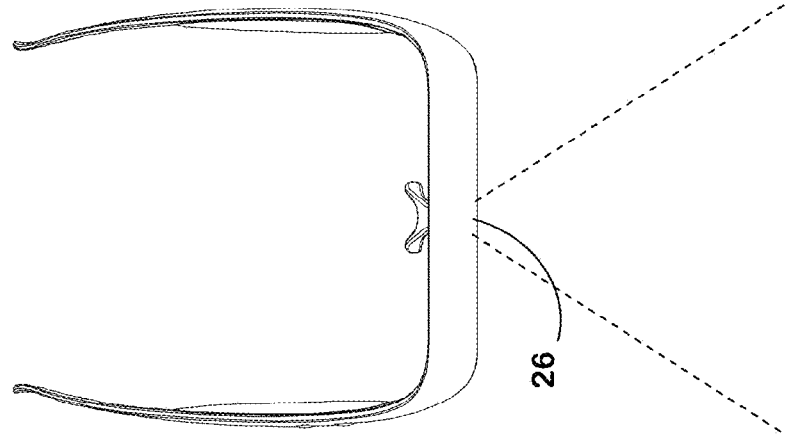

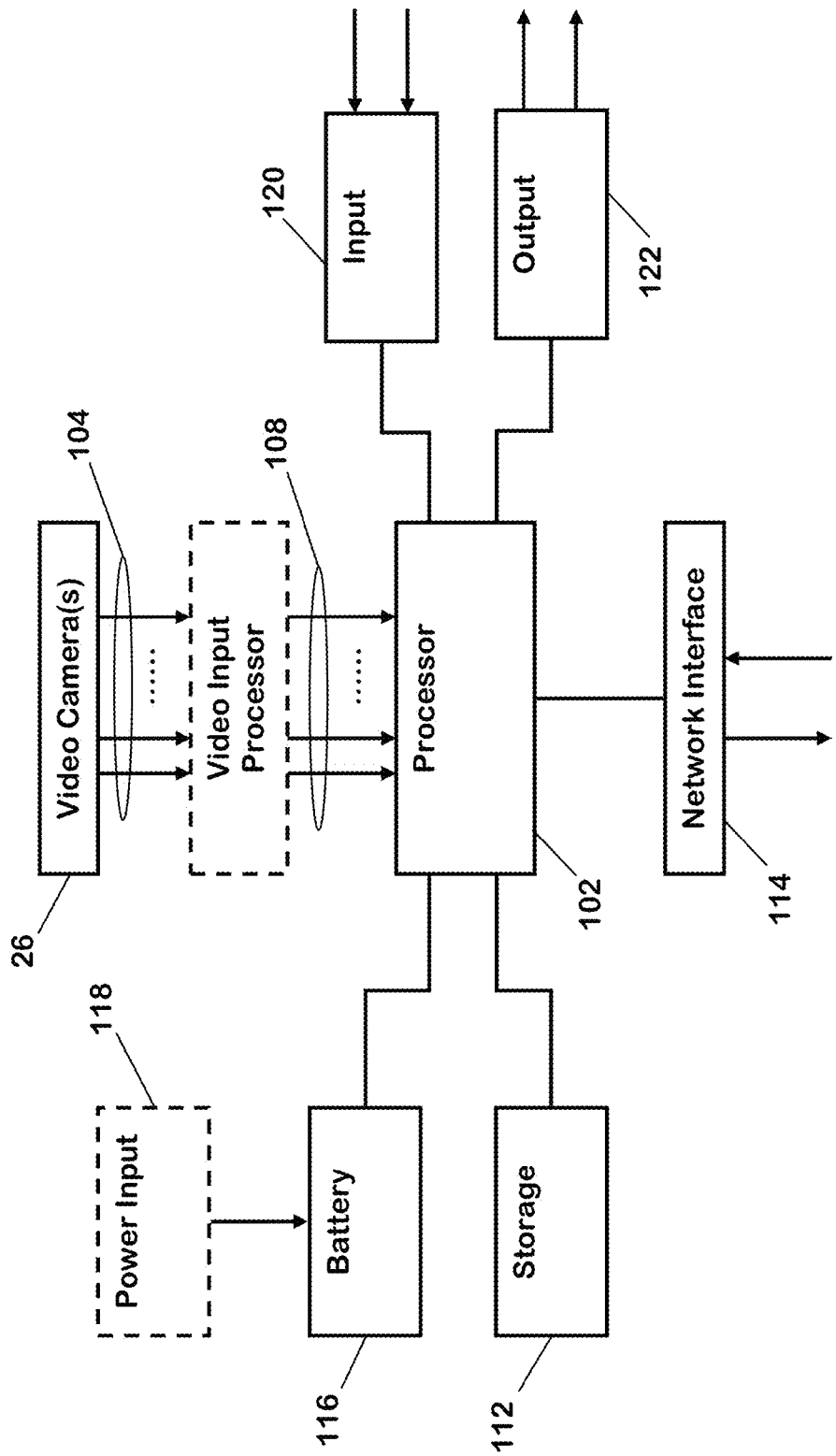

Internal component layout with estimate size

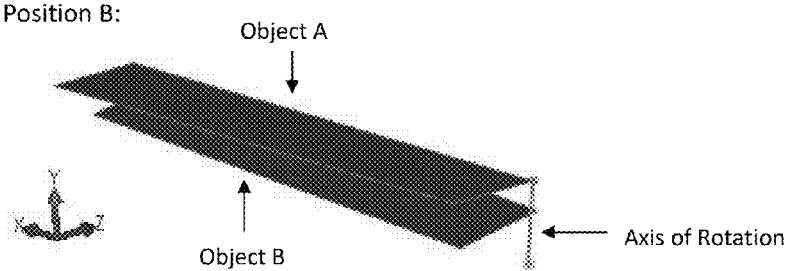
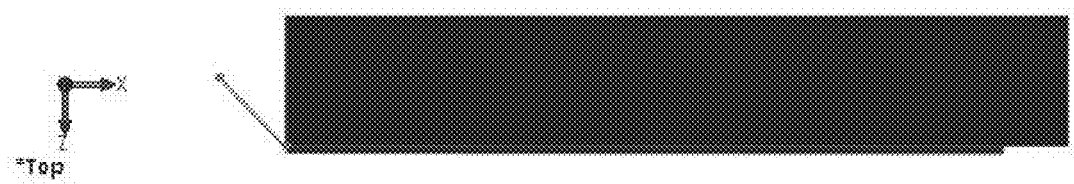
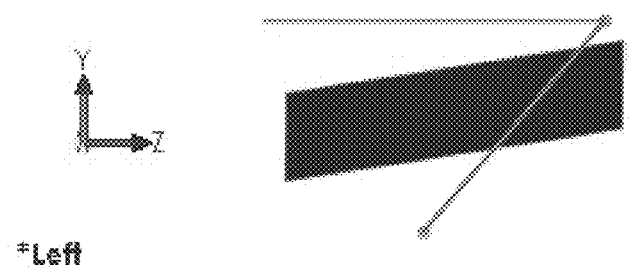
Figure 30

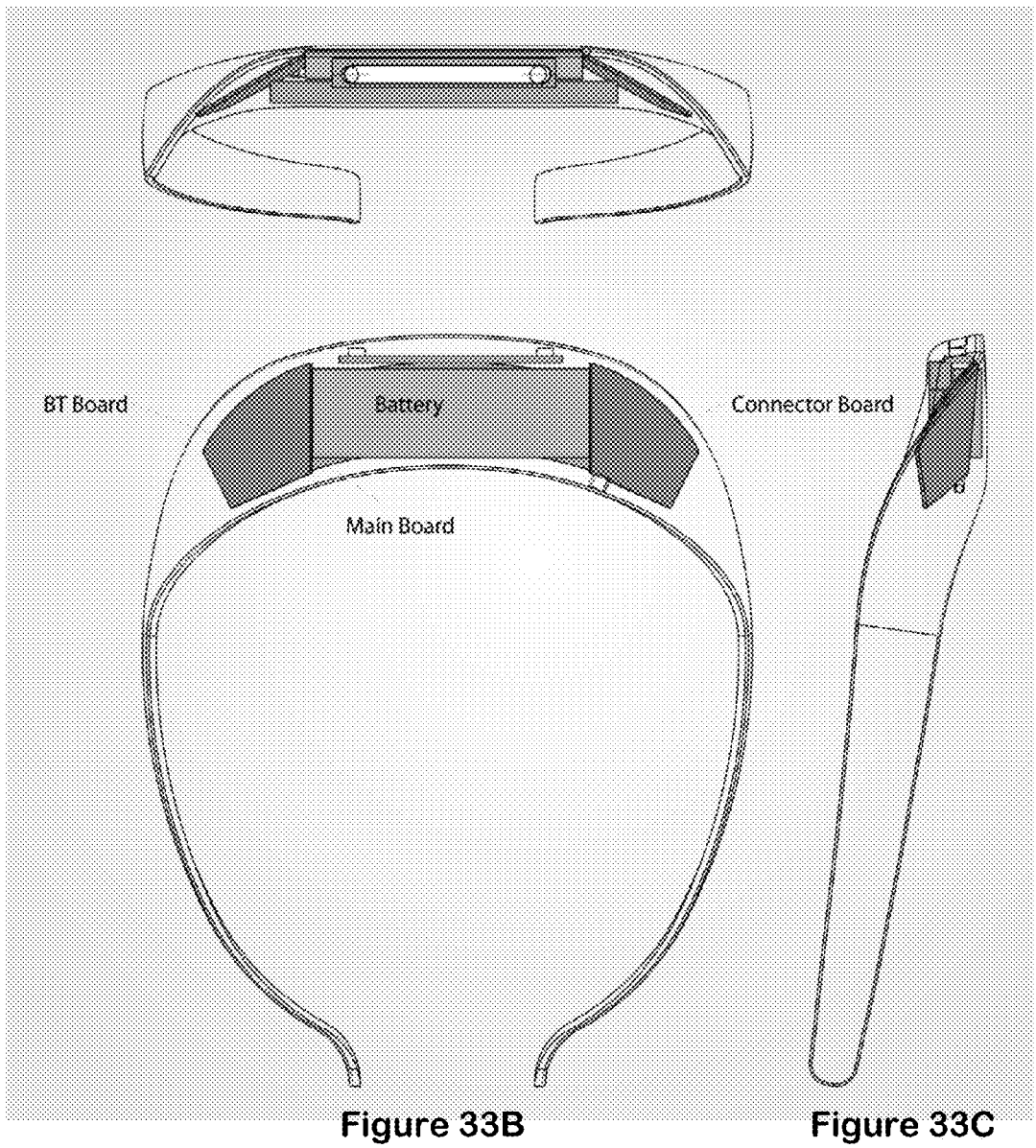

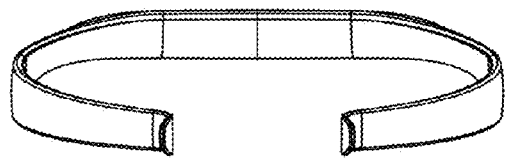
Figure 34A
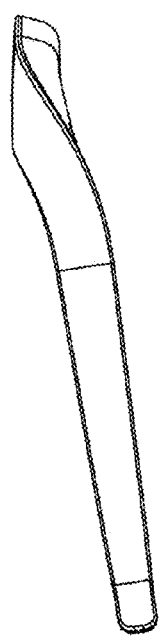
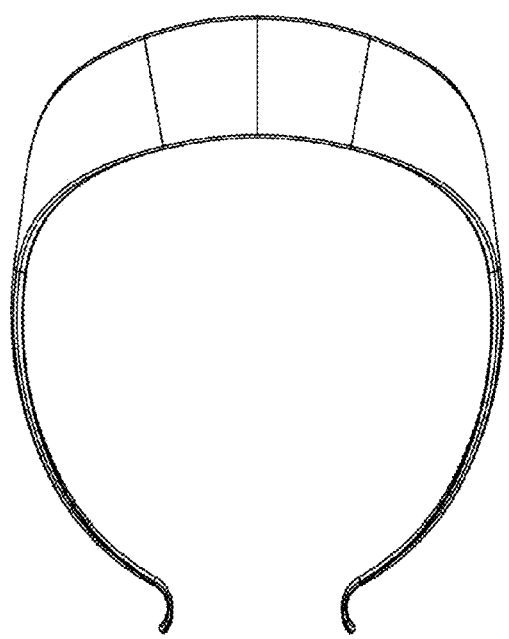
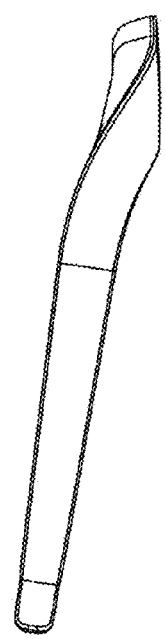
Figure 34B    Figure 34C    Figure 34D
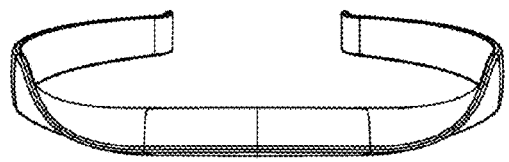
Figure 34E

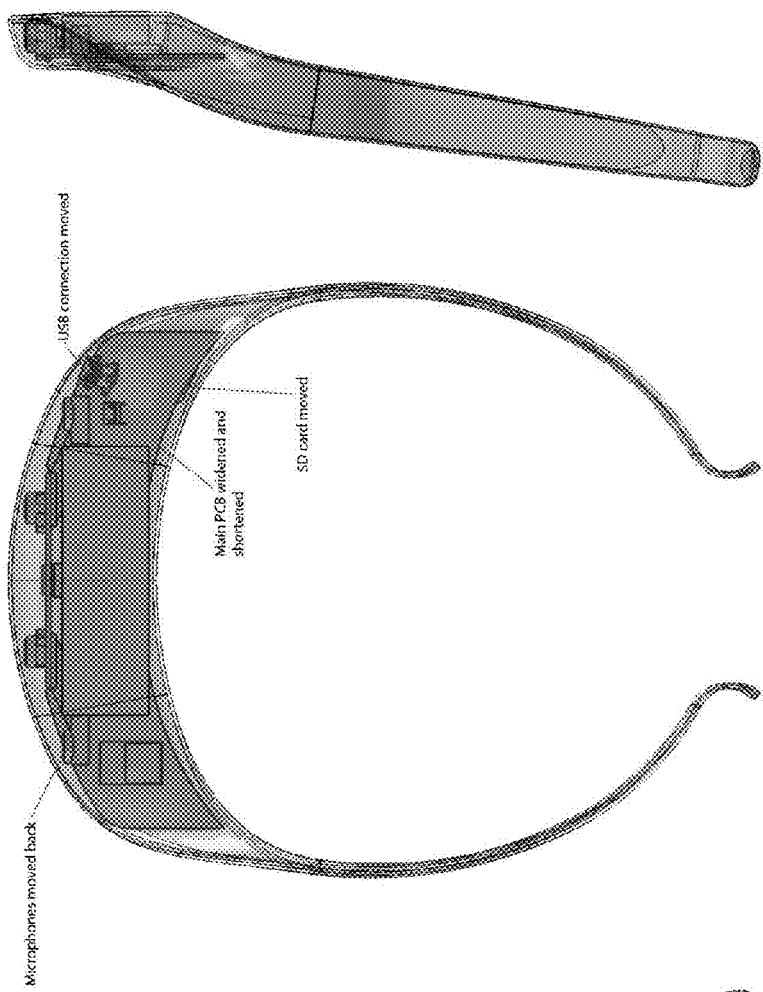
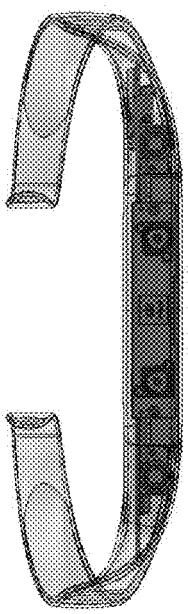
Figure 37A
Figure 37B
Figure 37C
Figure 37D

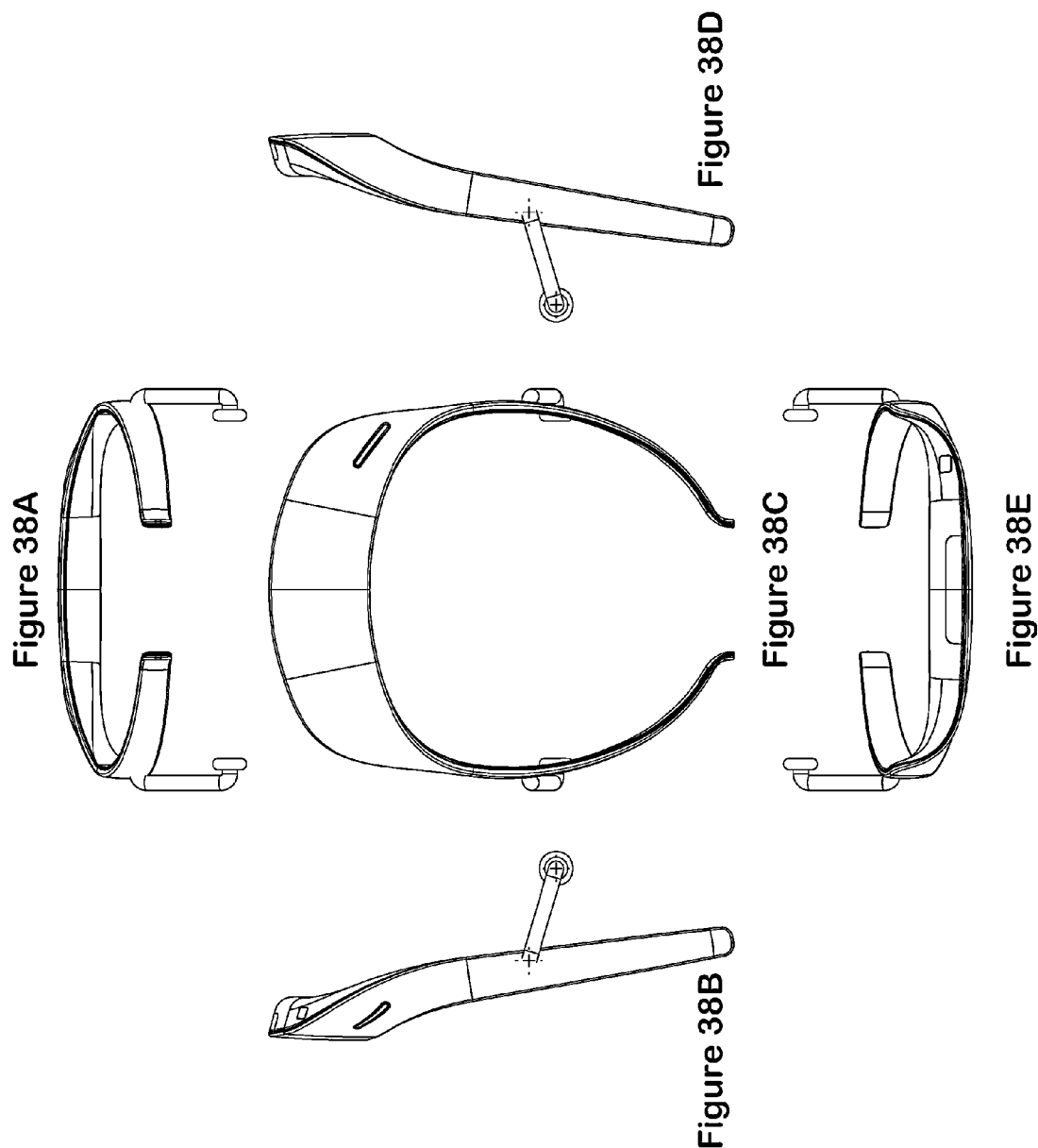

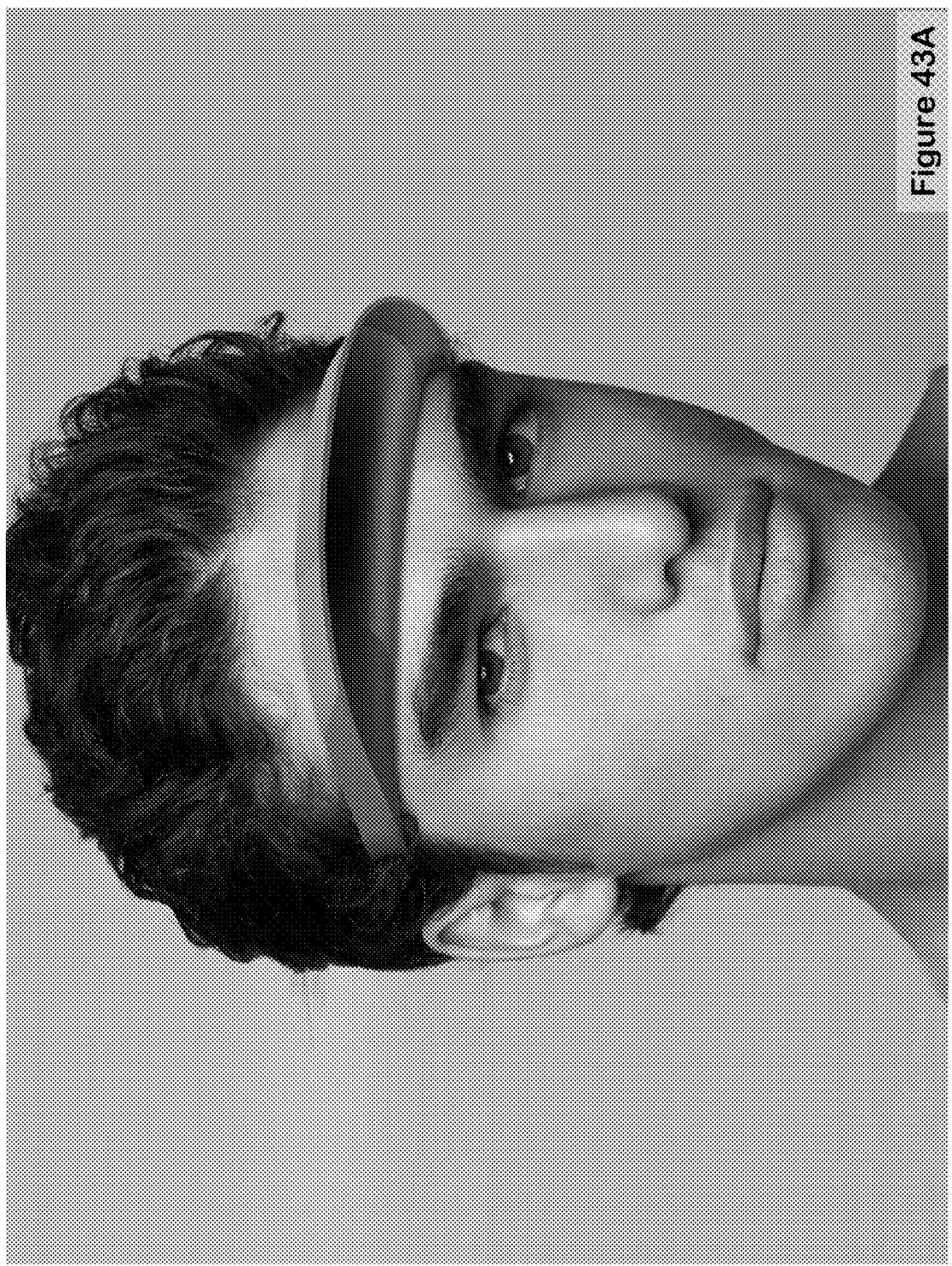

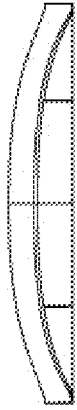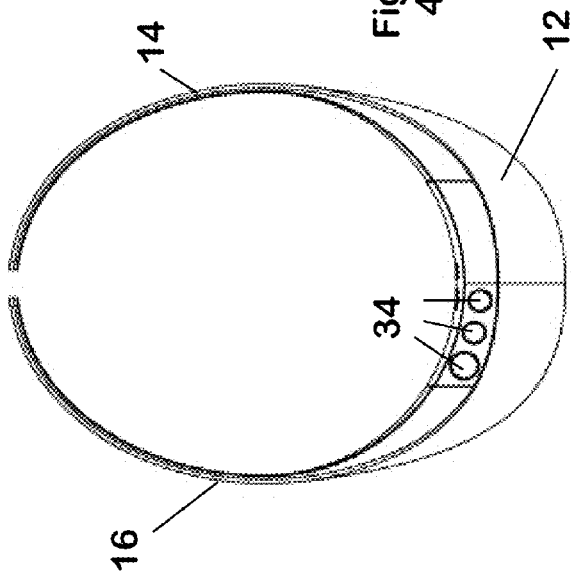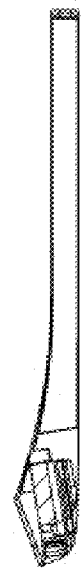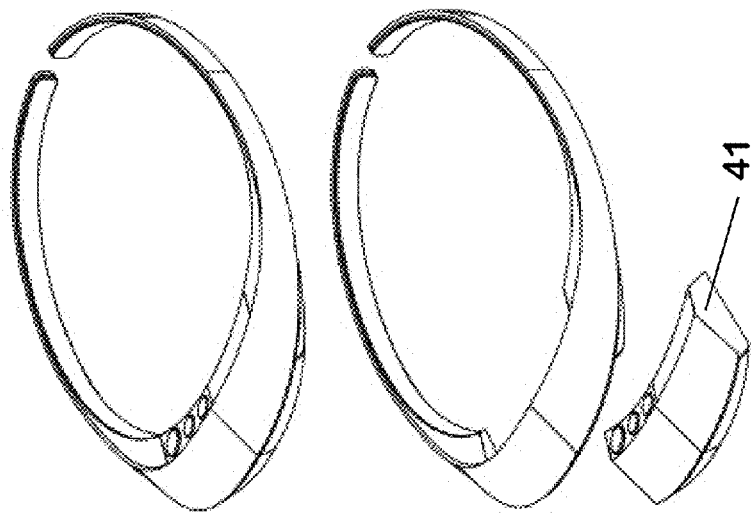
Figure 45A
Figure 45B
Figure 45C
Figure 45D
Figure 45E
Figure 45F
Figure 45G

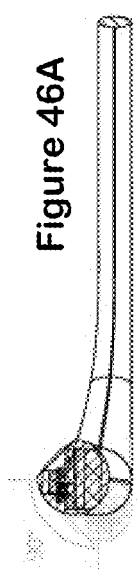
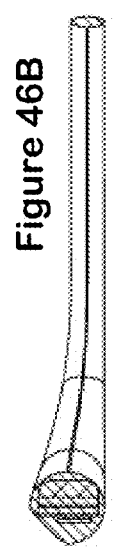
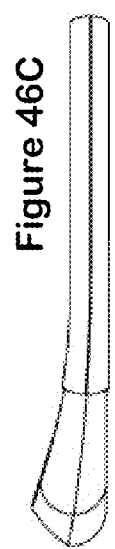
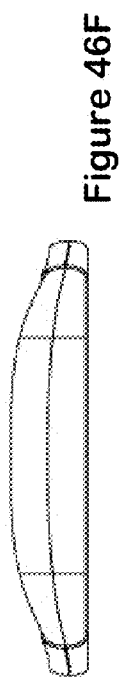
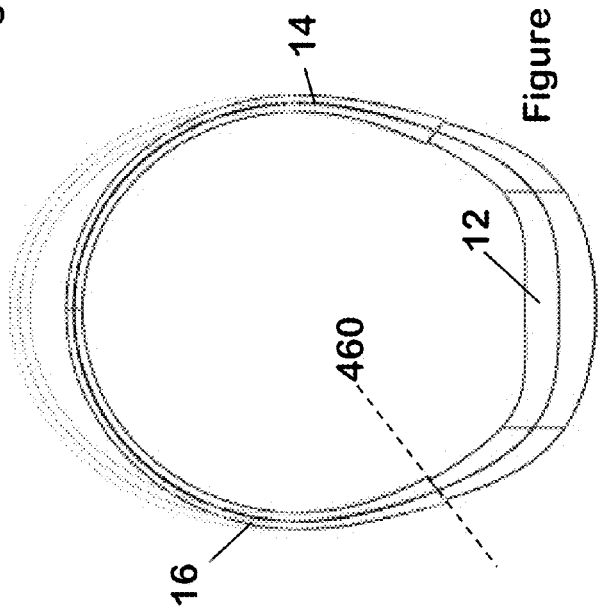
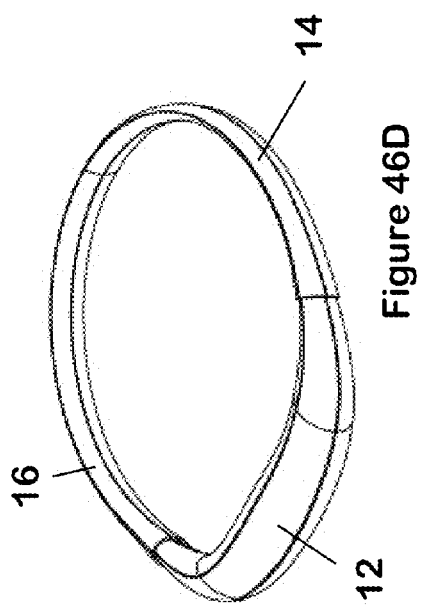

VIDEO CAMERA BAND AND SYSTEM

CROSS-REFERENCE TO RELATED APPLICATIONS

This application claims benefit of U.S. Provisional Application No. 61/610,580, filed Mar. 14, 2012, U.S. Provisional Application No. 61/585,145, filed Jan. 10, 2012, and U.S. Provisional Application No. 61/566,400, filed Dec. 2, 2011, each of which are hereby incorporated by reference in their entireties.

TECHNICAL FIELD

This invention relates to video cameras and network connected systems for archiving digital videos. In particular, a band housing two video cameras is provided which is capable of 2D and/or 3D video capture and a network connected system is provided which accepts digital videos uploaded by users and archives them in a way promoting their easy access, use and enjoyment by others.

DESCRIPTION OF RELATED ART

For many years, home movie cameras and video cameras have been familiar to consumers as tools for capturing movies or video of special events, family gatherings and other occasions. At first, motion picture cameras (such as Standard 8 format) were configured to capture video as a series of discrete still images received through an optical lens and periodically recorded on a moving photosensitive film. Later, video cameras (such as VHS format) were developed to record video as a series of discrete still images each broken down into a matrix of pixels, pixel information being recorded sequentially and row by row on a magnetically sensitive tape. Recently, digital video cameras have been developed which again break video down into sequential still images further divided into pixels, but record pixel information digitally in storage media such as optical discs, hard drives and/or semiconductor memory.

As a still further development, stereoscopic video cameras have been proposed which are configured to record video capable of being displayed in three dimensions (3D video). The term "3D video" is somewhat of a misnomer, however, as 3D video is not actually captured or displayed in three dimensions as present in the original event being captured, but is instead captured and displayed in such a manner as to trick the human brain into perceiving the contents of the displayed 3D video as having a depth reminiscent of the original event. As understood by one skilled in the art, such a feat is made possible, in one exemplary approach, by independently capturing and displaying at least two different perspectives of the same original event. In one simple example, a left and right camera are spaced apart by some non-zero distance and may each be employed to capture two dimensional (2D) video of the same event. Later, the left and right 2D video is displayed to a person's left and right eyes, respectively. For example, a lenticular display or specially configured active or passive glasses paired with complementary displays may be used to display 3D video. In addition, many other technologies are available now or may become available in the future for displaying the 3D video to a user. However, such technologies are not the focus of the present disclosure and will not be discussed in greater detail. Rather, it will be appreciated that one skilled in the art would be familiar with these technologies or at least capable of employing them without undue experimentation or research.

As mentioned above, video cameras have typically only been used up till now to capture special events. Cost and/or complexity, among other drawbacks, have limited their popularity for everyday use. In addition, the videos recorded by conventional video cameras often have very limited potential uses, further discouraging the everyday use of video cameras. For example, while conventional websites like You Tube or Google Video provide online depositories for users' videos, use of the uploaded videos is typically limited to rudimentary search and playback functionality.

Conventional video cameras may also be provided with real time upload capabilities. For example, a webcam may be configured to stream video signals to a remote location through an internet connection. In one example, such video signals may be used in a private communication, for example a Google Talk or Skype video call. In another example, such video signals may be publicly shared via a public video stream, for example via the conventional websites Livestream or Ustream. However, such platforms are also typically limited to rudimentary search and playback functionality.

Thus, there remains a demand for video cameras without the drawbacks of conventional video cameras and for video storage and distribution platforms which encourage the diverse and widespread use of video content.

SUMMARY

This invention relates to video camera bands which include at least one camera, a processor and a network interface.

In general, in one aspect, the invention features a video camera band configured to be worn by a user, the video camera band comprising a left side portion, a right side portion, a bridge between the left side portion and right side portion configured to rest in a front-facing direction relative to the user's body, a user input receiver, a network interface configured to transmit data to and receive data from a remote computing device, at least one video camera, a local storage, a power source, a processor configured to receive video from the at least one video camera, store the received video in the local storage and transmit the stored video to the remote computing device via the network interface at the direction for the user input receiver.

Implementations of the invention may include one or more of the following features. The video camera band may comprise at least two video cameras included in the bridge. The at least two video cameras may be spaced apart on the bridge such that a left video camera is closer to the left side portion and a right video camera is closer to the right side portion and the processor is configured to combine video from the right and left video cameras into 3D video. The user input receiver, network interface, at least one video camera, local storage, power supply and processor may be included within the bridge. At least one of the user input receiver, network interface, at least one video camera, local storage, power supply and processor may be provided within a removable bridge component which may be configured for removal from the bridge. At least one of the user input receiver, network interface, at least one video camera, local storage, power supply and processor may be configured for removal from the video camera band. The processor may be configured to process the received video to produce a first processed video of a first bandwidth and a second processed video of a second bandwidth, the second bandwidth being higher than the first bandwidth and the first and second processed videos corresponding to the received video, store the first and second processed videos in the local storage and begin transmission of the first processed video via the network interface before beginning transmission of the second processed video via the network interface. The left side portion may be hingedly attached to the bridge, the right side portion may be hingedly attached to the bridge and the left side portion and right side portion may be configured so as to be hingeable relative to the bridge between a wear configuration and a storage configuration. The at least one video camera may be included in the bridge, the left side portion may be swivelably attached to the bridge, the right side portion may be swivelably attached to the bridge and the bridge may be configured to swivel relative to the left and right side portions between a visor configuration and a necklace configuration such that the at least one video camera is oriented in the same direction when the user wears the video camera band in the visor configuration as when the user wears the video camera band in the necklace configuration. The video camera band may further include a local buffer and in an absence of a record command, the processor may be configured to store received video in the local buffer and upon receipt of a retroactive record command, the processor may be configured to transfer a predetermined amount of video previously stored in the local buffer to the local storage. Upon the receipt of a period record command, the processor may be configured to store a predetermined amount of video received in the future in the local storage. Upon receipt of a retroactive record command, the processor may be also configured to store a predetermined amount of video received in the future in the local storage. The video camera band may further comprise a microphone and audio captured by the microphone may be included in the video received, stored and transmitted by the processor. The video camera band may further comprise speakers provided near the user's ears to output audio received via the network interface.

BRIEF DESCRIPTION OF THE DRAWINGS

The above mentioned and other aspects, features and advantages can be more readily understood from the following detailed description with reference to the accompanying drawings wherein:

FIGS. 1A-1G show a front, top, bottom, left, right, rear and perspective views, respectively, of a video camera band according to an exemplary embodiment of the present disclosure;

FIGS. 2A-2C show a left, front and perspective view of a video camera band according to an exemplary embodiment of the present disclosure in an open position;

FIGS. 6A-6D show top views of various video camera bands according to various exemplary embodiments of the present disclosure;

FIG. 7 shows a notional view of a functional block diagram of a video camera band according to an exemplary embodiment of the present disclosure;

FIGS. 28-31 represent a description of an exemplary side portion hinge and its geometric configuration;

FIGS. 33A-33C are computer renderings of front, top and side views, respectively of a video camera band and its internal components according to an exemplary embodiment of the present disclosure;

FIGS. 34A-34G are rear, right side, top, left side, front, front-left-bottom perspective and rear-right-top perspective views, respectively, of a video camera band according to an exemplary embodiment of the present disclosure;

FIGS. 37A-37D are computer renderings of top, right side, left side and front views, respectively, of a video camera band and its internal components according to an exemplary embodiment of the present disclosure;

FIGS. 38A-38G are rear, right side, top, left side, front, rear-right-top perspective and perspective views, respectively, of a video camera band according to an exemplary embodiment of the present disclosure;

FIG. 43A is a photograph of a model wearing a video camera band according to another exemplary embodiment of the present disclosure and FIGS. 43B, 43C and 43D are left perspective, top left perspective and right front perspective views, respectively, of the video camera band shown in FIG. 43A;

FIGS. 45A-F and 45H-J are cross section, left side, front top left perspective, front top left perspective with a removed removable electronics unit, top, front, top front top left perspective with a removed removable electronics unit, rear left top perspective and front views, respectively, of a video camera band according to another exemplary embodiment of the present disclosure and FIG. 45G is a photograph of a model wearing the video camera band shown in FIGS. 45A-F and 45H-J; and FIGS. 46A-F are cross section in a first configuration, cross section in a second configuration, left side, front top left perspective, front and top views, respectively, of a video camera band according to another exemplary embodiment of the present disclosure, FIG. 46G is a photograph of a model wearing the video camera band shown in FIGS. 46A-F in the second configuration and FIG. 46H is a photograph of a model wearing the video camera band shown in FIGS. 46A-F in the first configuration.

DETAILED DESCRIPTION

Figure 11:
FIGS. 11-14 are photographs of a model wearing a video camera band according to still another exemplary embodiment of the present disclosure.
Figure 12:
Figure 13:
Figure 14:
Figure 15A:
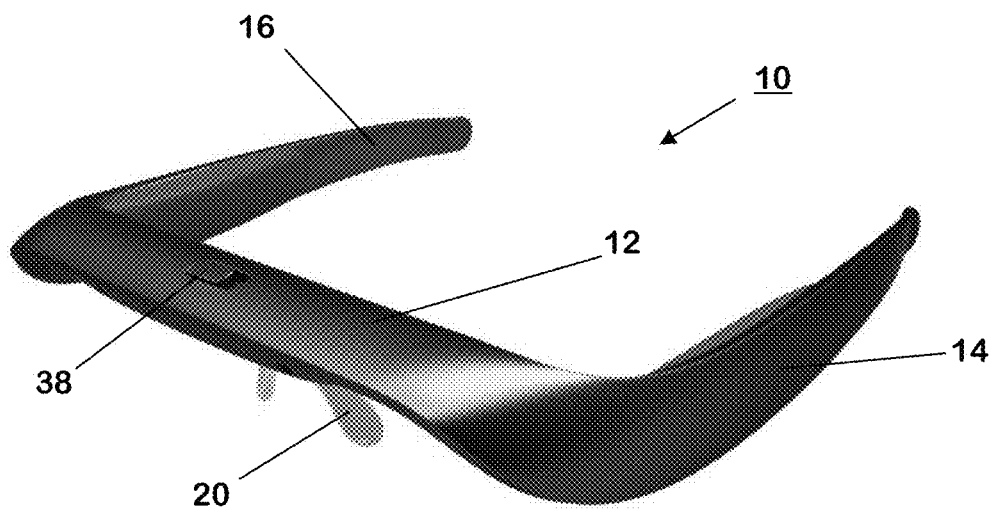
FIGS. 15A and 15B are computer renderings of a front-left-top perspective view of video camera bands according to exemplary embodiments of the present disclosure.
Figure 15B:
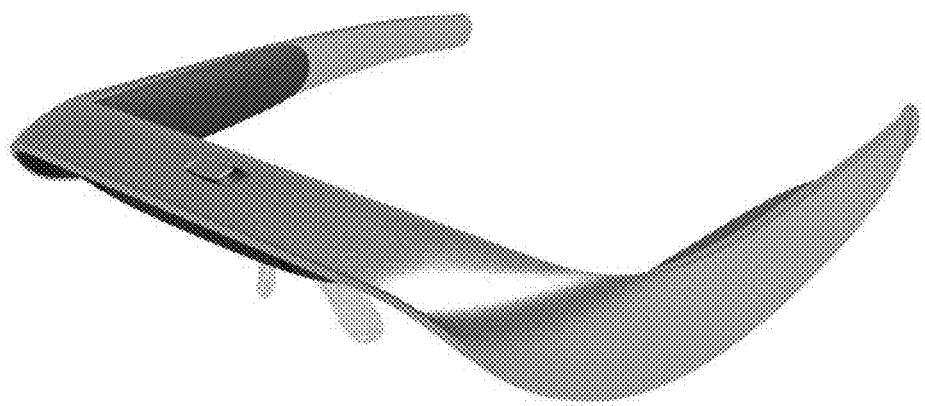
Figure 16A:
FIGS. 16A and 16B are computer renderings of a top view of video camera bands according to exemplary embodiments of the present disclosure.
Figure 16B:
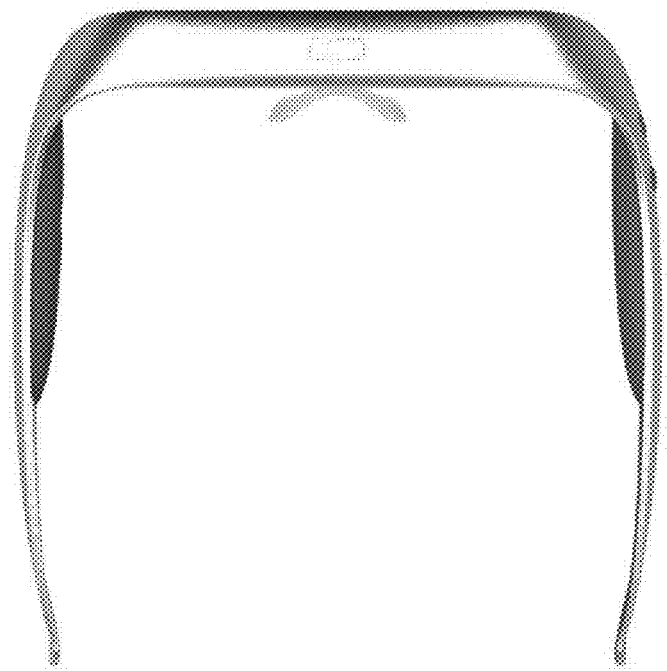
Figure 17A:
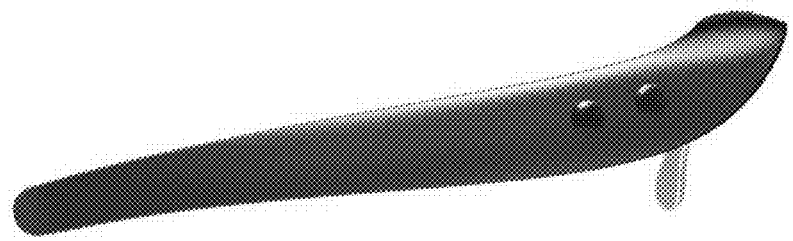
FIGS. 17A and 17B are computer renderings of a right side view of video camera bands according to exemplary embodiments of the present disclosure.
Figure 17B:
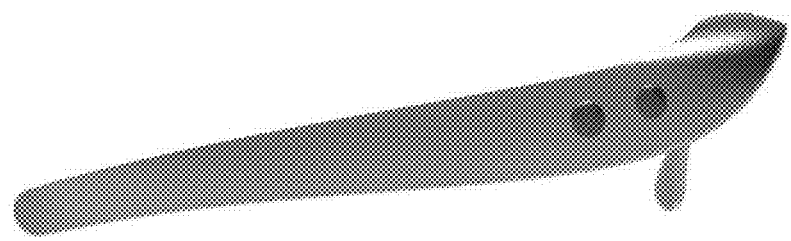
Figure 18A:
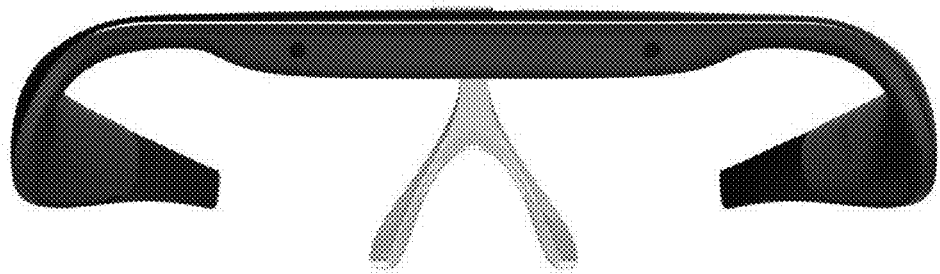
FIG. 18A is a computer rendering of a front view of a video camera band according to an exemplary embodiment of the present disclosure.

In an aspect of the present disclosure, a video camera band 10, an example of which is shown in FIGS. 1A-1G, is provided with a bridge 12 and left and right side portions 14 and 16, respectively. Other examples of video camera bands are shown in FIGS. 34A-34G, 38A-G, 43A-D, 44A-F, 45A-J and 46A-H. The left and right side portions 14 and 16 may be configured to rest atop a wearer's ears, as shown in FIG. 13. The left and right side portions 14 and 16 may be rigidly fixed to the bridge 12, as shown in FIGS. 1A-1G and 11-21B, or may be connected to the bridge 12 by side hinges 18, as shown in FIGS. 2A-4C. An example of a side hinge 18 is discussed in further detail below with respect to FIGS. 2A-4C and 28-31. The video camera band 10 may also include a nose piece 20 configured to rest atop a wearer's nose. The nose piece 20 may be rigidly attached to the bridge 12 or may be connected to the bridge 12 by a nose piece hinge (not shown). Thus, the video camera band 10 of the present disclosure is worn much like a pair of eyeglasses (as shown in FIG. 11), although no portion of the video camera band 10 is within the line of vision of the wearer. In another example, the video camera band may be provided with components which do fall within the line of sight of a wearer, such as prescription optical lenses, for example. Further, the video camera band 10 of the present disclosure allows the wearer to also wear any eyeglasses or sunglasses (as shown in FIGS. 12-14) or hat (as shown in FIG. 14) without interference by the video camera band 10. The video camera band 10 of the present disclosure also has the benefit of not interfering with a wearer's hairstyle. For example, the left and right side portions may be worn outside or inside a wearer's long hair, as shown in FIGS. 53 and 54, respectively.

Figure 1G:
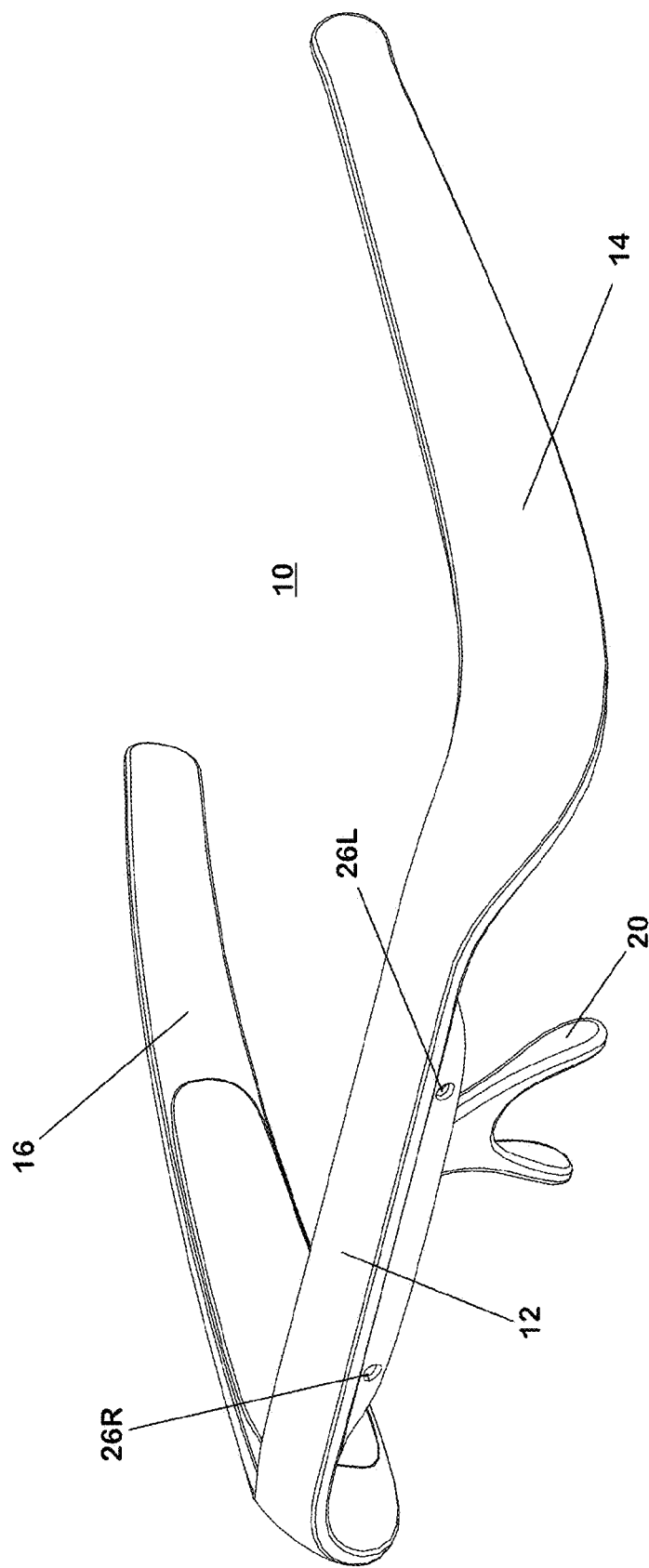
Figure 3B:
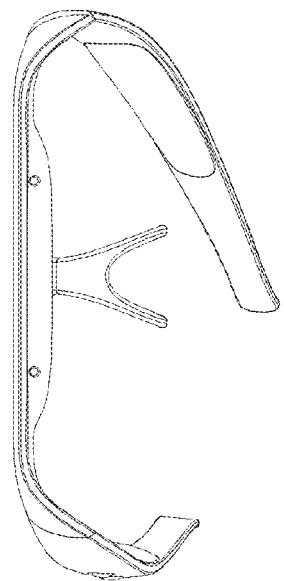
FIGS. 3A-3C show a left, front and perspective view of the video camera band of FIGS. 2A-2C in a partially closed position.
Figure 3C:
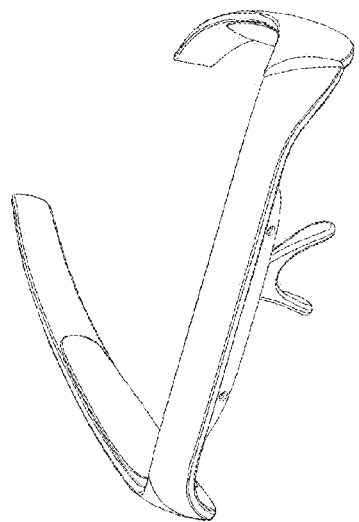
Figure 3A:
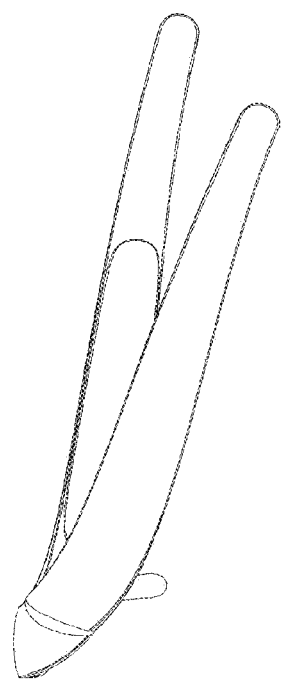
Figure 4A:
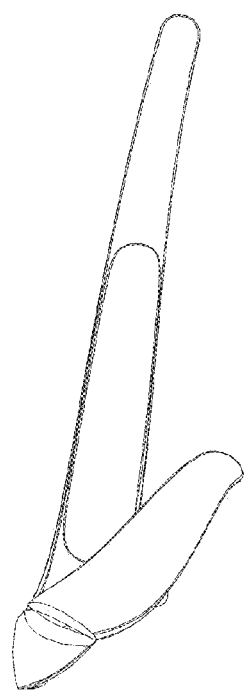
FIGS. 4A-4C show a left, front and perspective view of the video camera band of FIGS. 2A-2C and 3A-3C in an almost closed position.
Figure 4B:
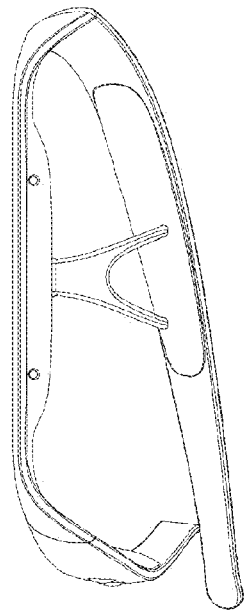
Figure 4C:
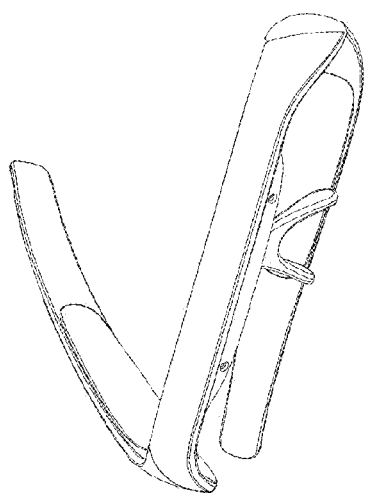

The video camera band 10 may take many shapes in addition to those described in the present disclosure. In the example shown in FIGS. 1A-1G, the bridge 12 and left and right portions 14 and 16 are each generally flat in shape and each has a pair of generally opposing surfaces which are much larger in area relatively than the other surfaces. These pairs of generally opposing surfaces may be described generally as being parallel to a major plane for each of the bridge 12 and left and right side portions 14 and 16. As shown in FIG. 1B or 1C, the major plane of the right side portion 16 and left side portion 14 may be oriented generally parallel to each other while, as shown in FIG. 1G, the major plane of the bridge 12 may be oriented generally orthogonally to the major planes of the left and right side portions 14 and 16. Another example of a video camera band is shown in FIG. 3, which is discussed in more detail below. As shown by the example of FIG. 3, the present video camera band can be configured in many shapes and configurations while still adhering to the principles discussed herein.

Figure 46H:
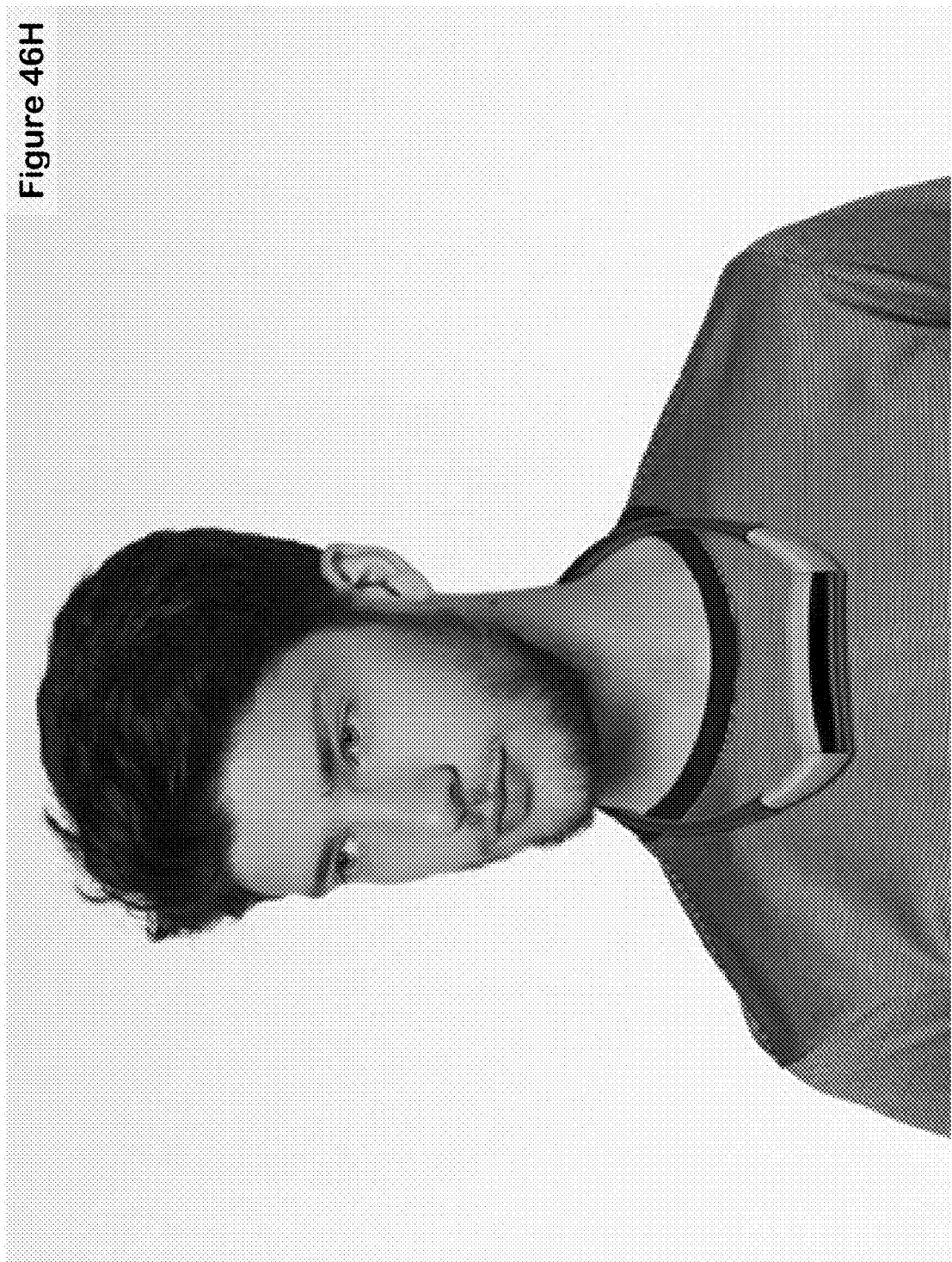

In another example, shown in FIGS. 46A-H, a video camera band may include a bridge 12 configured to swivel about left and right side portions 14 and 16 such that the video camera band may be worn as a visor, as shown in FIG. 46G, or as a necklace, as shown in FIG. 46H. In this example, the bridge may be swiveled relative to the left and right side portions so that the camera(s) included in the bridge point forward. Of course, the bridge may be swiveled so that the camera(s) included therein are pointed in another direction other than forward. FIGS. 46A and 46B show a cross section through the bridge 12 of the bridge portion being rotated 90 degrees±20 degrees from the position shown in FIG. 46B to the position shown in FIG. 46A. In one example, a profile of the bridge along a plane to perpendicular to an axis of swivel between the bridge and side portions may be circular or near circular and a profile of the bridge or side portions taken along a plane 460 perpendicular to a main axis of the bridge 12 or side portion 14 or 16, respectively may be oval shaped, the circular or near circular profile being determined by an angle between the axis of swivel and the main axes of the bridge and side portions.

In addition, FIGS. 15A-21B and 57-64 show video camera bands according to other exemplary embodiments of the present disclosure. As shown in FIGS. 15A-21B and 39-46, for example, multiple materials and colors may be used for the various components of a video camera band. For example, a nosepiece 20 may be made of a clear material, while side portions 14 and 16 may comprise a combination of dark and light materials. Such contrasting materials may be integrally formed (for example by a plastic co-molding process, etc.) or a component such as the side portions 14 and 16 may be comprised of multiple sub-components each having their own distinct material and visual properties. In another example, materials for the various components of the video camera band may be chosen according to various technical requirements. For example, in the case that a video camera band is intended for use by firefighters in emergency situations, it may be beneficial to construct a housing or other component out of thermally insulative materials which are able to withstand high temperatures—ceramic or other high temperature composite, for example.

Figure 21A:
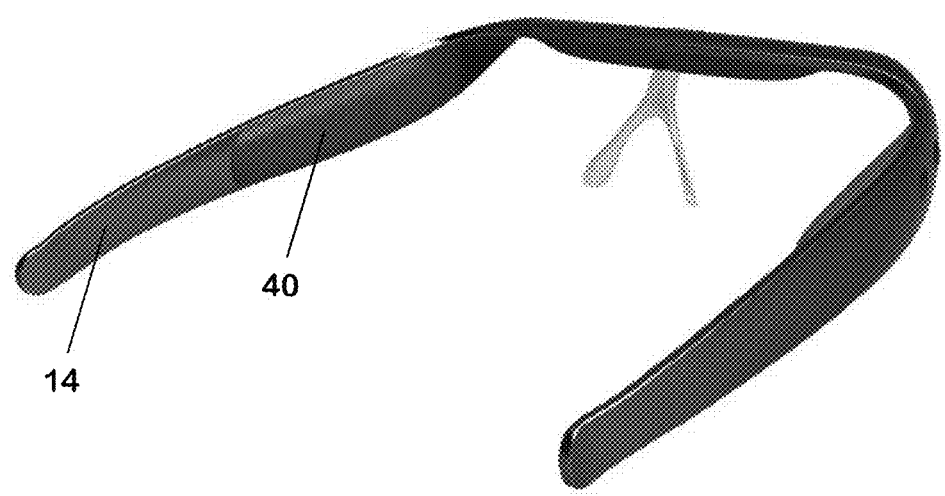
FIGS. 21A and 21B are computer renderings of a rear-right-top perspective view of video camera bands according to exemplary embodiments of the present disclosure.
Figure 21B:
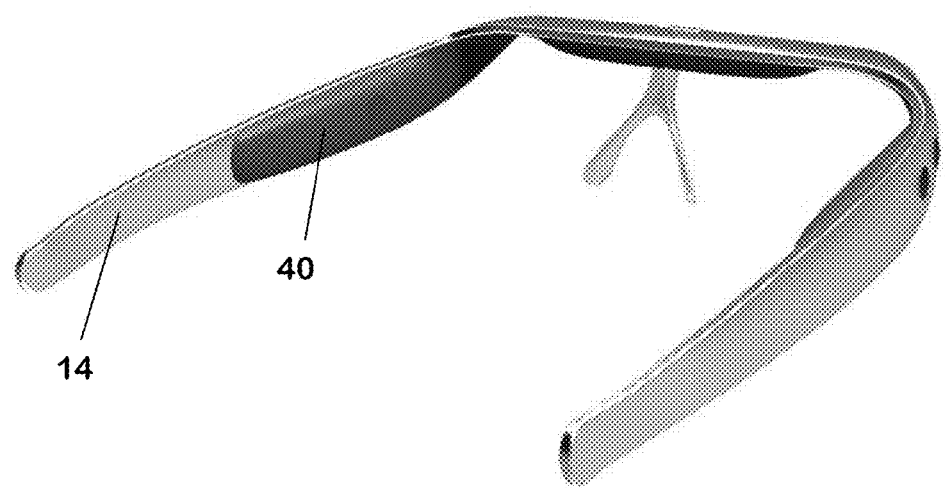
Figure 22:
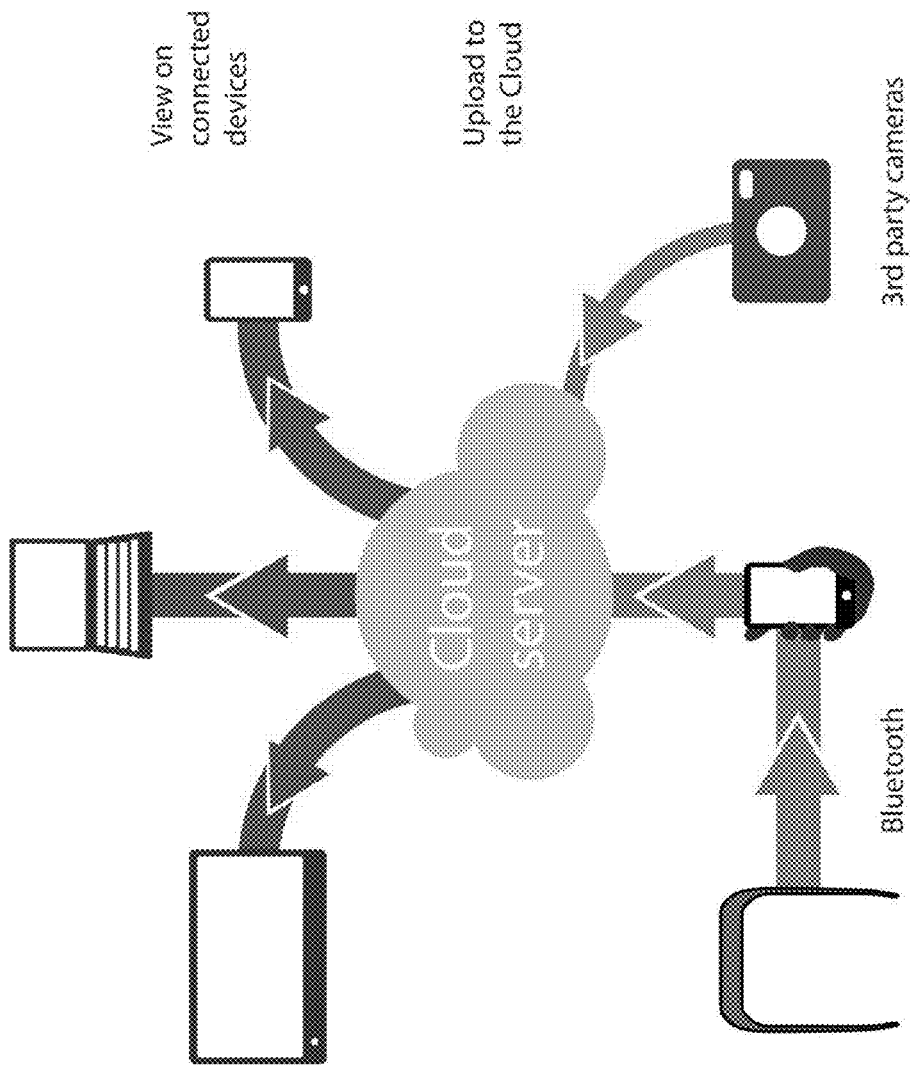
FIG. 22 is a flowchart showing the interaction of a video camera band in a video upload system according to an exemplary embodiment of the present disclosure.
Figure 23:
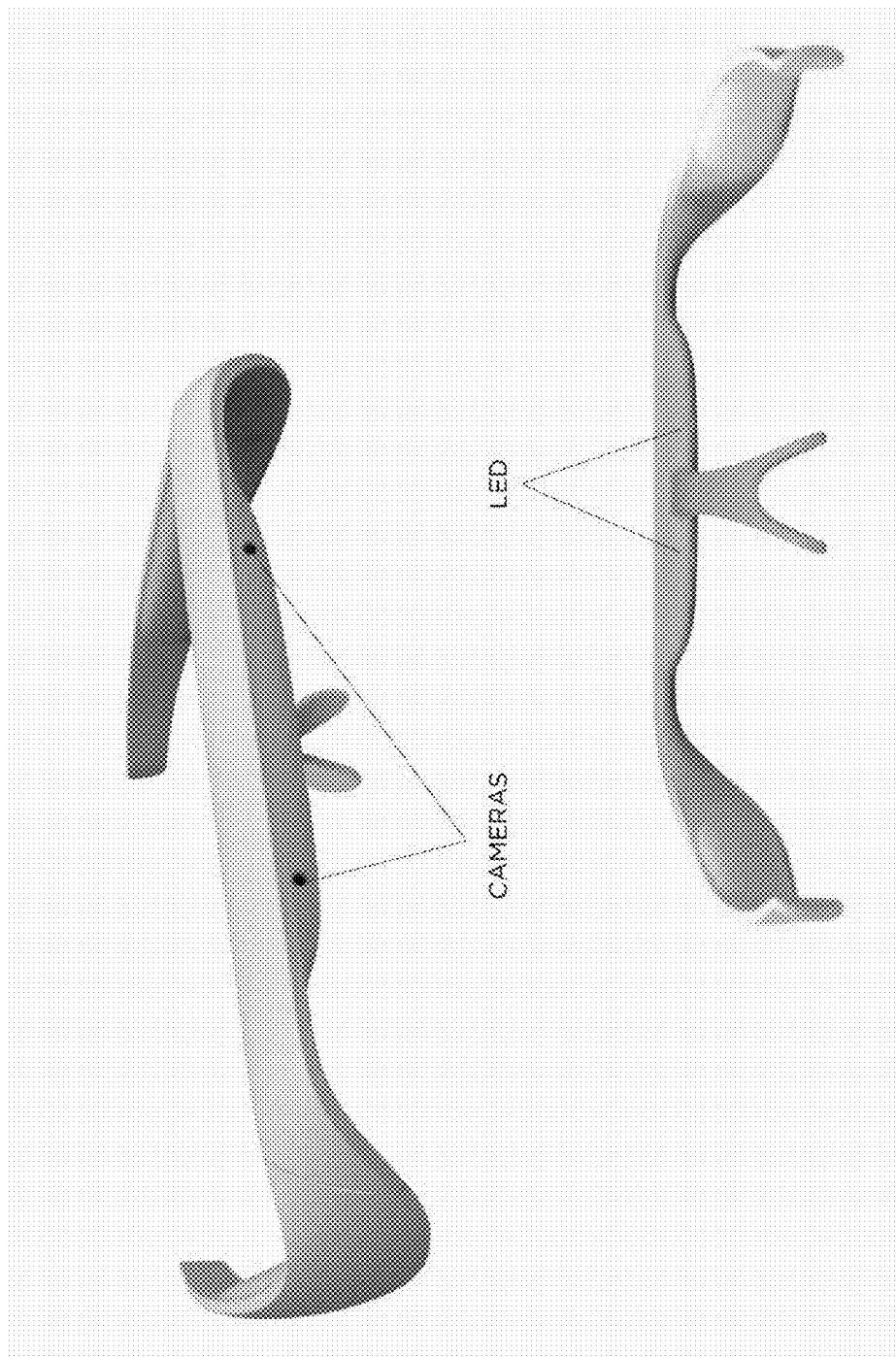
FIGS. 23-27 are notional views of an example of a video camera band according to another exemplary embodiment of the present disclosure.
Figure 24:
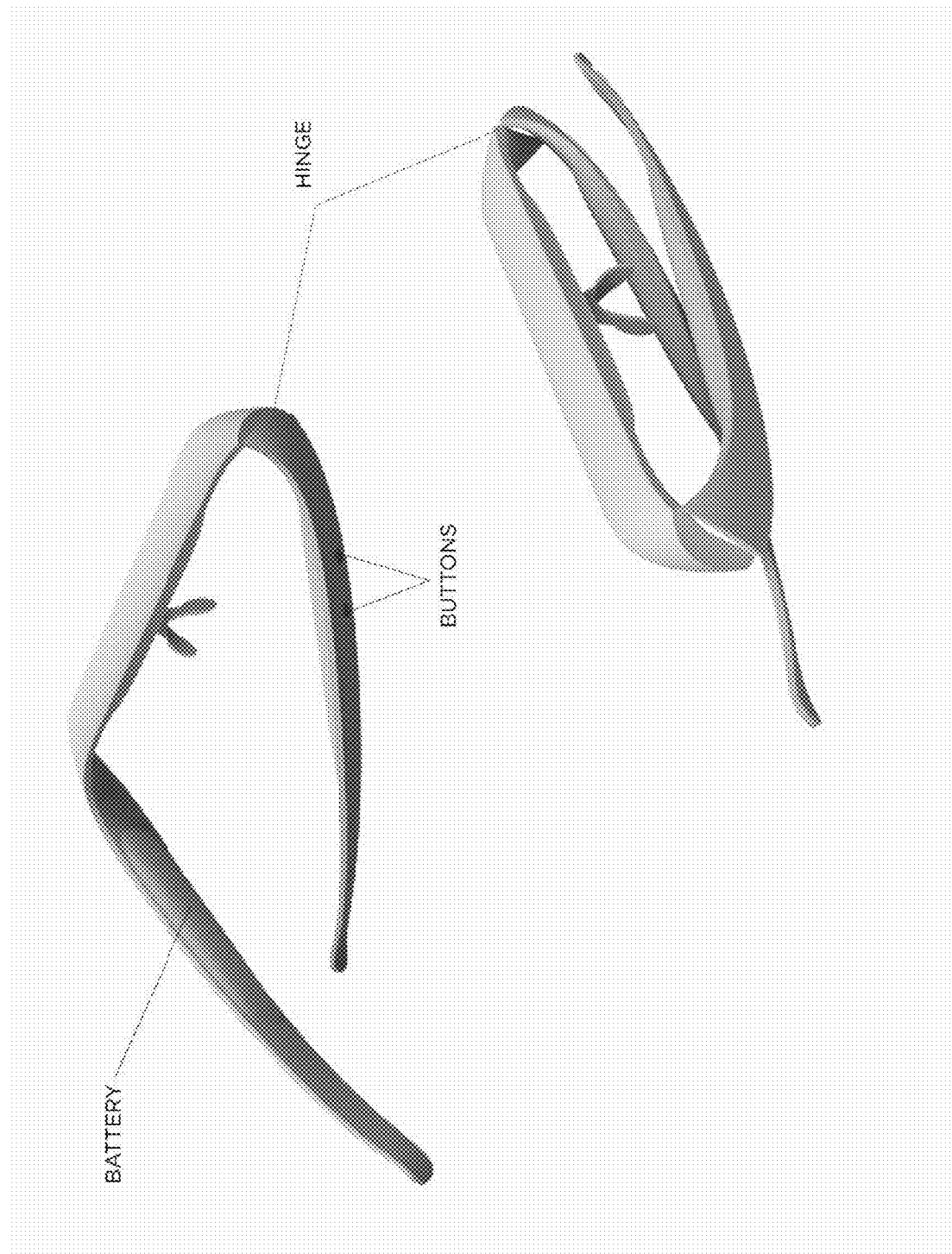
Figure 25:
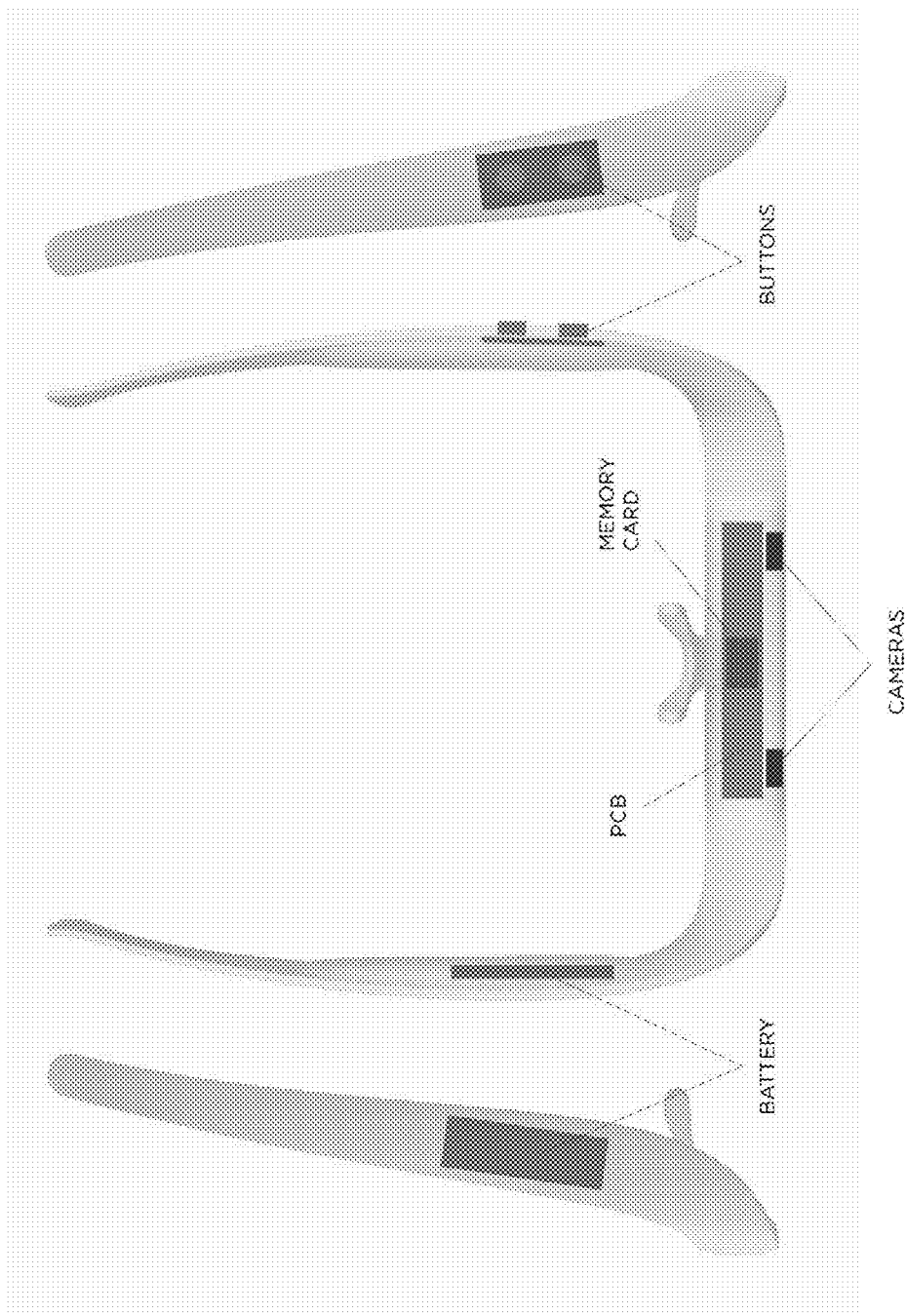
Figure 26:
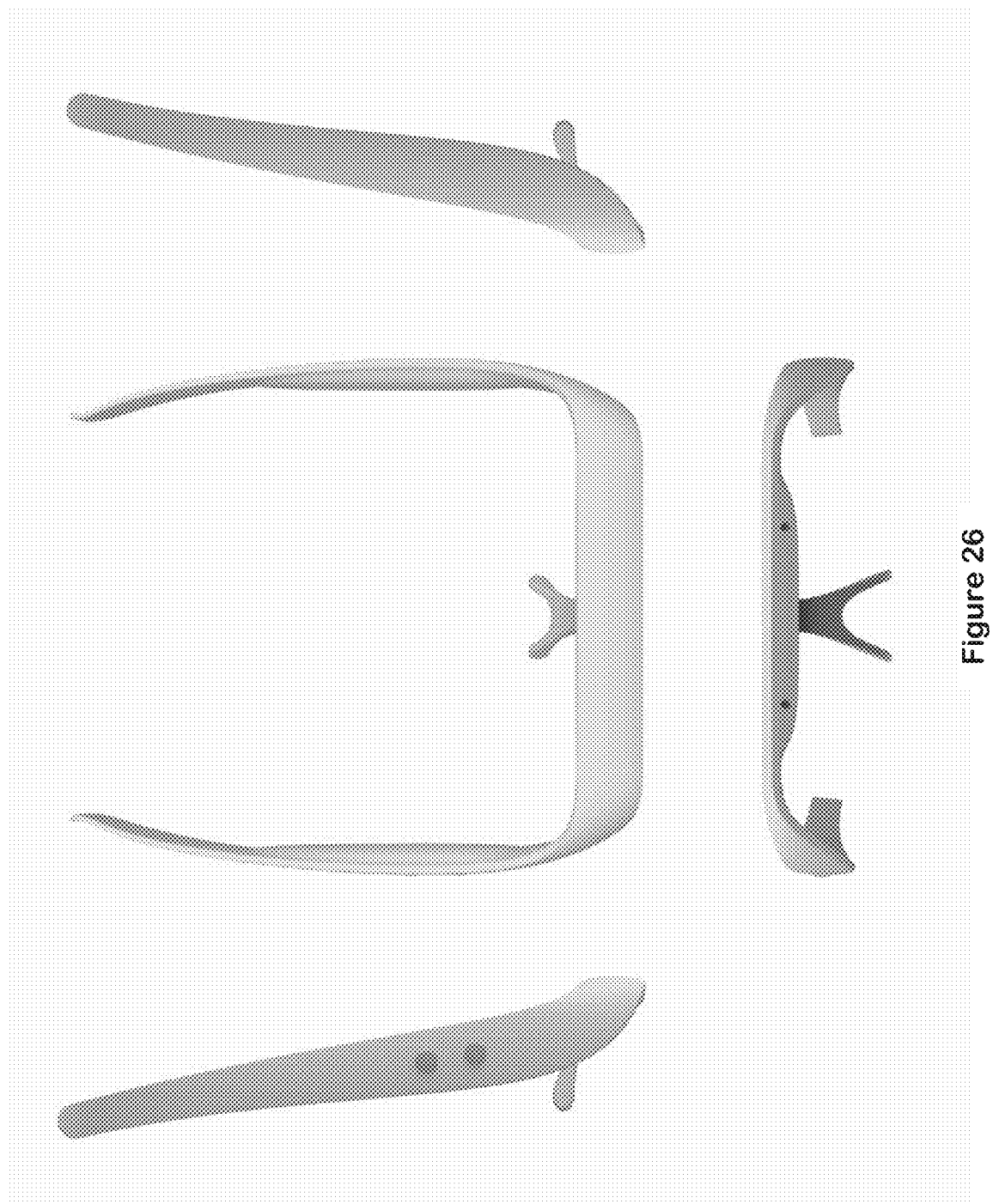
Figure 27:
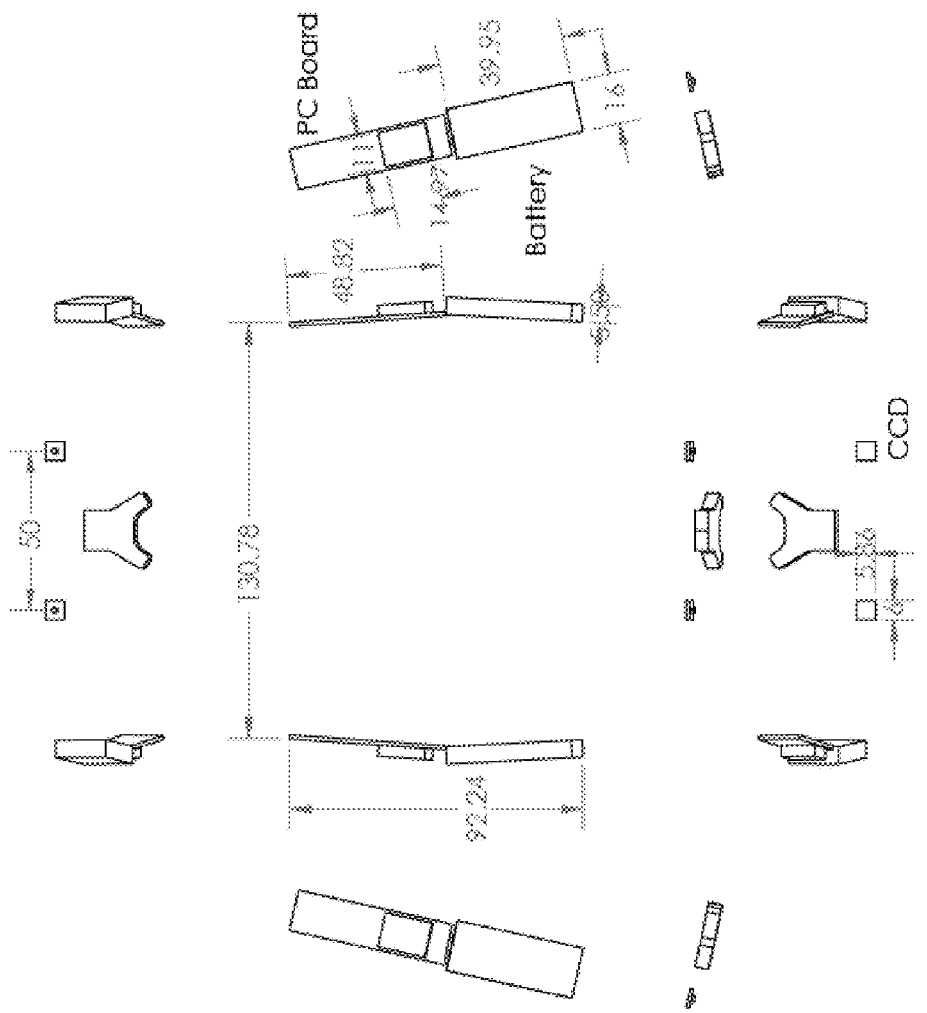
Figure 28:
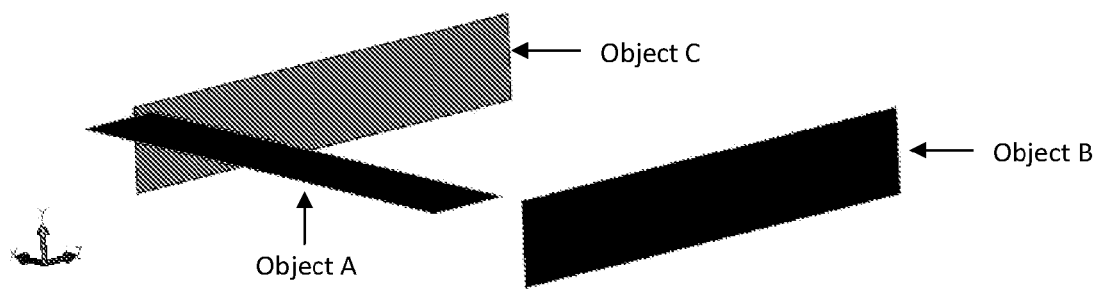
Figure 29:
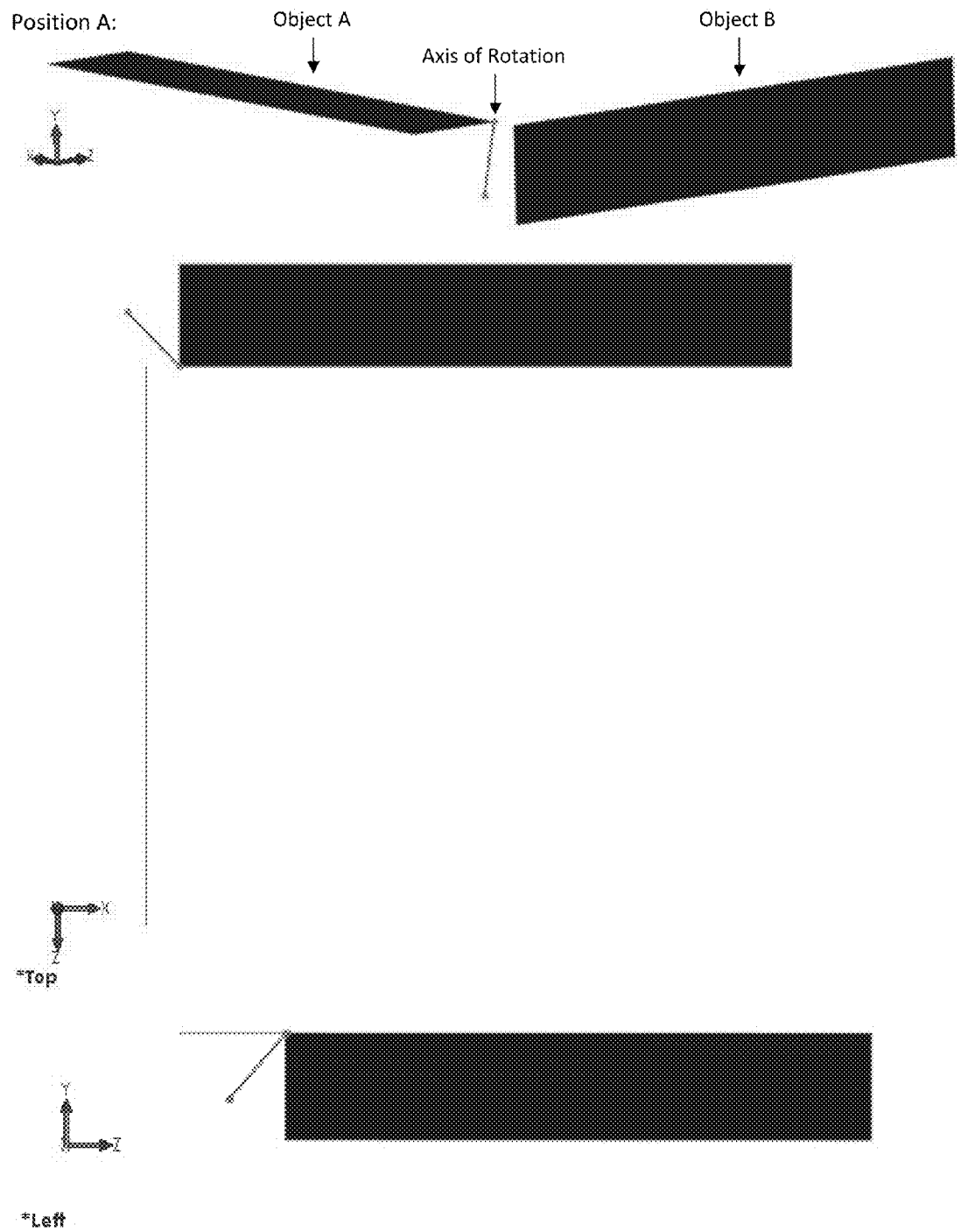
Figure 31:
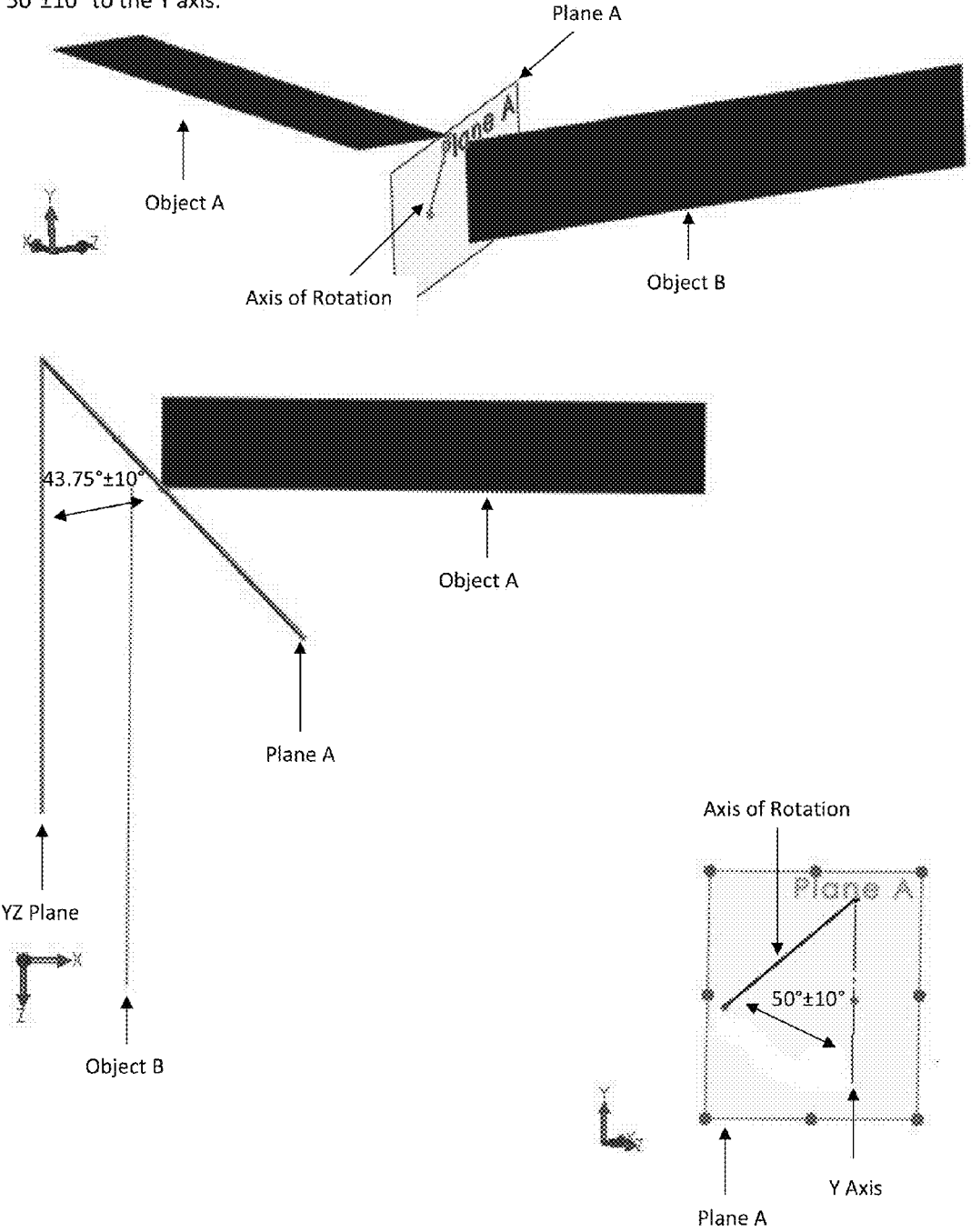
Figure 32:
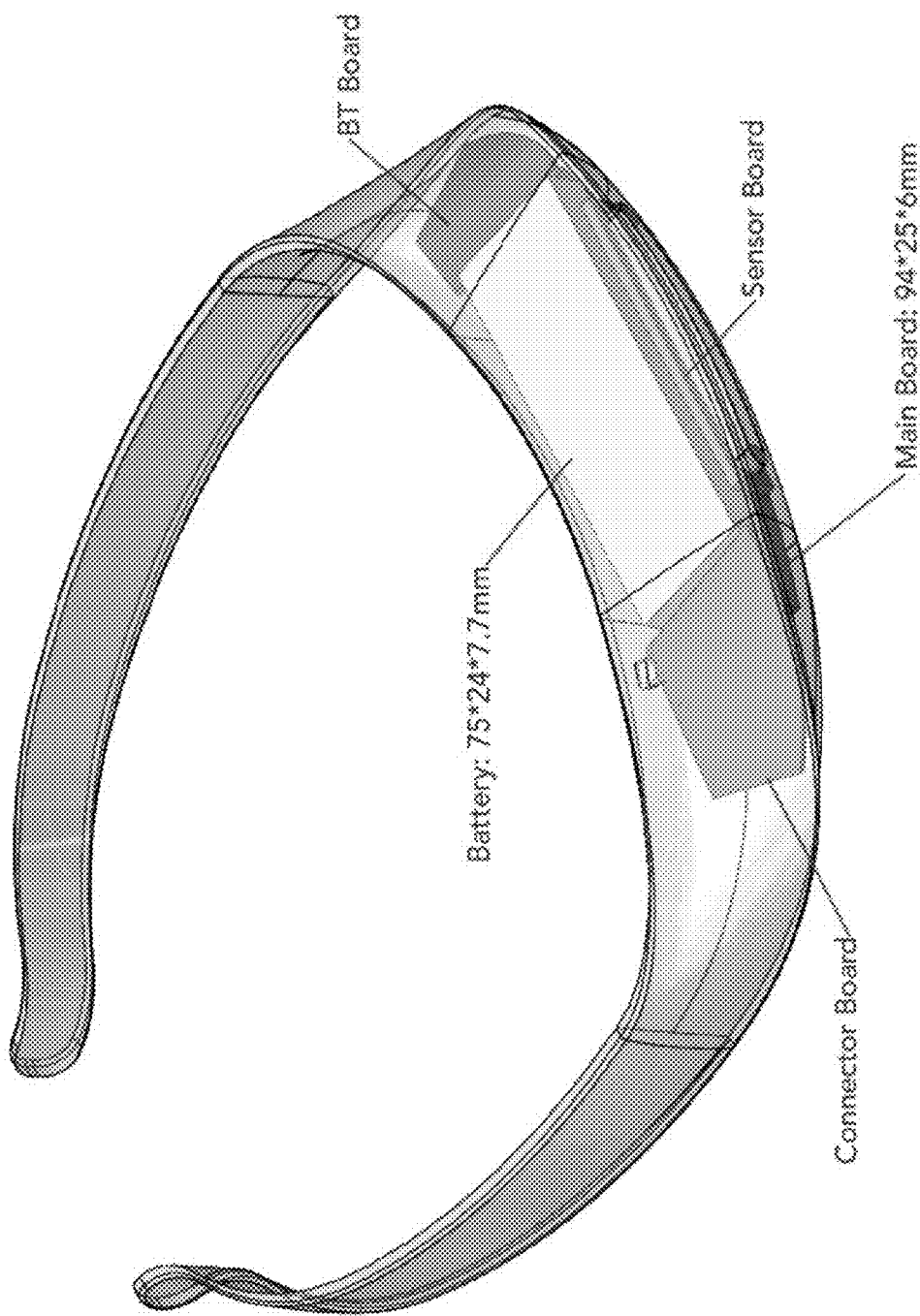
FIG. 32 is a computer rendering of a perspective view of a video camera band and its internal components according to an exemplary embodiment of the present disclosure.
Figure 34F:
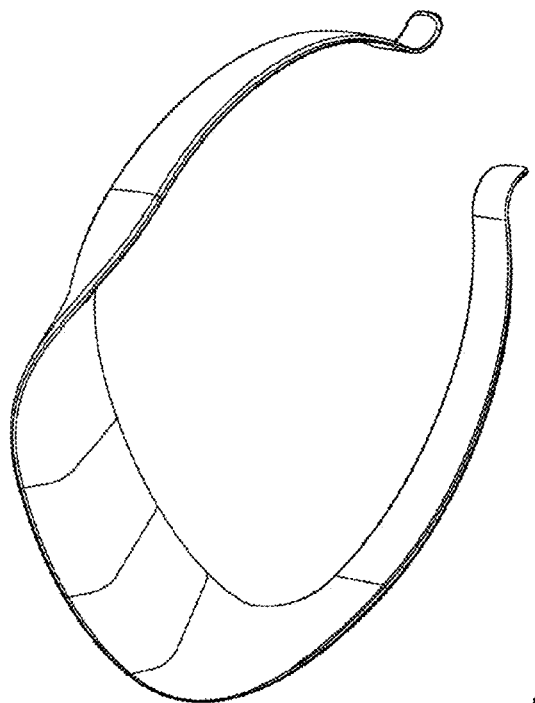
Figure 34G:
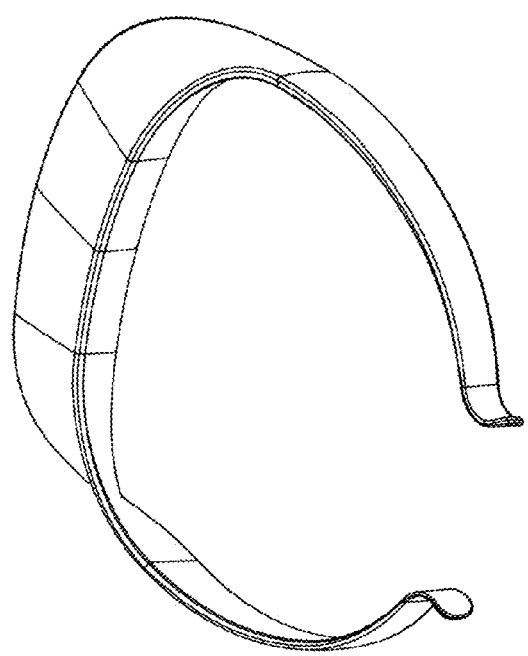
Figure 35:
FIGS. 35 and 36 are photographs of a model wearing a video camera band according to still an exemplary embodiment of the present disclosure.
Figure 36:
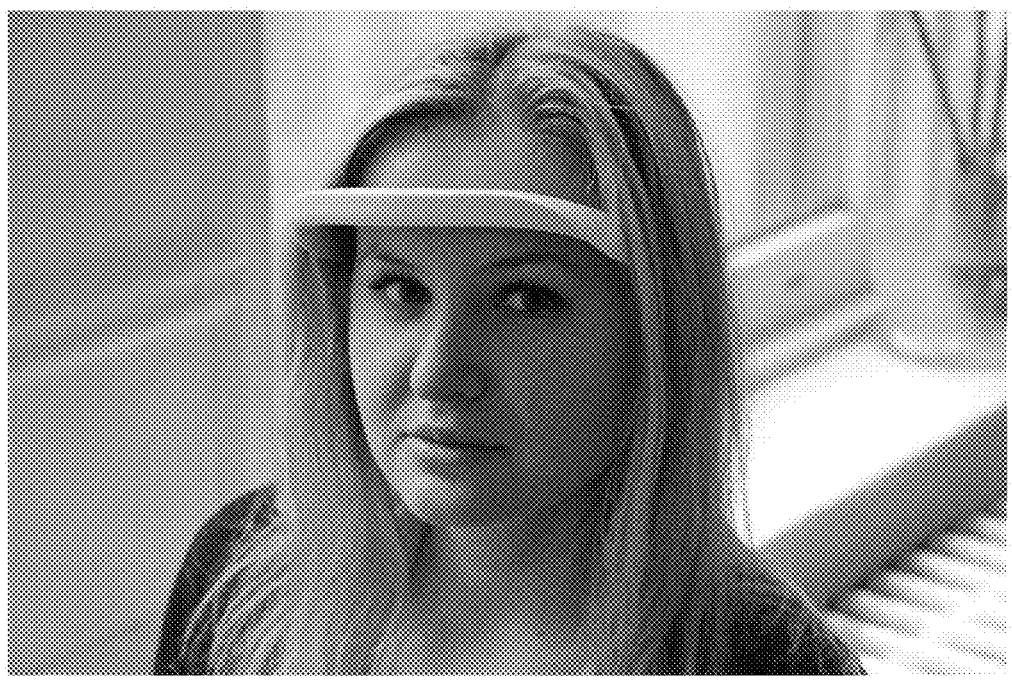
Figure 38F:
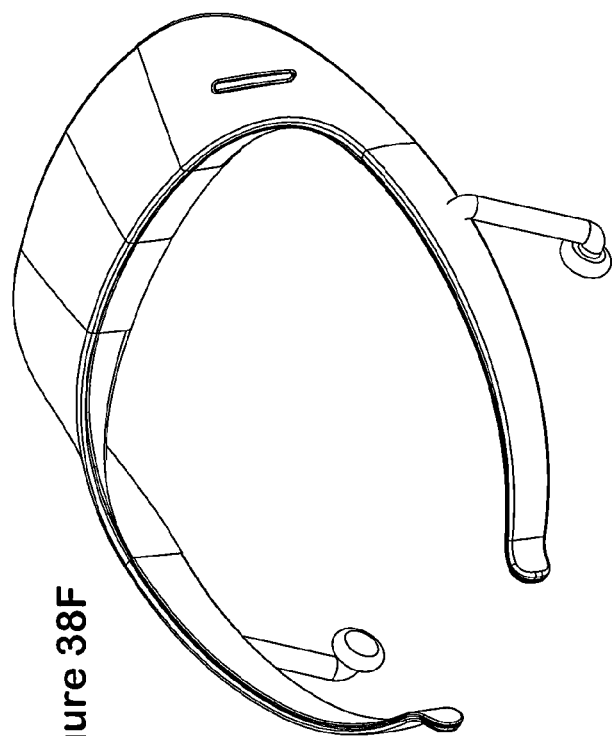
Figure 38G:
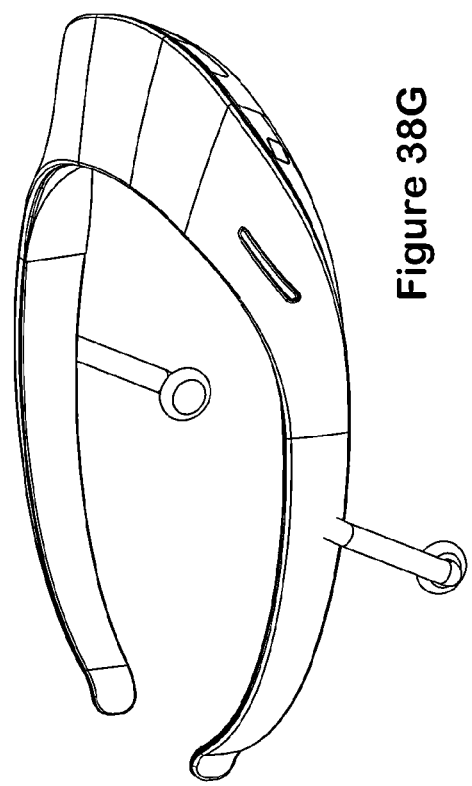
Figure 39:
FIGS. 39-42 are front-left-top, front-left-bottom, rear-left-top and front-right-bottom perspective views, respectively, of a video camera band according to an exemplary embodiment of the present disclosure.
Figure 40:
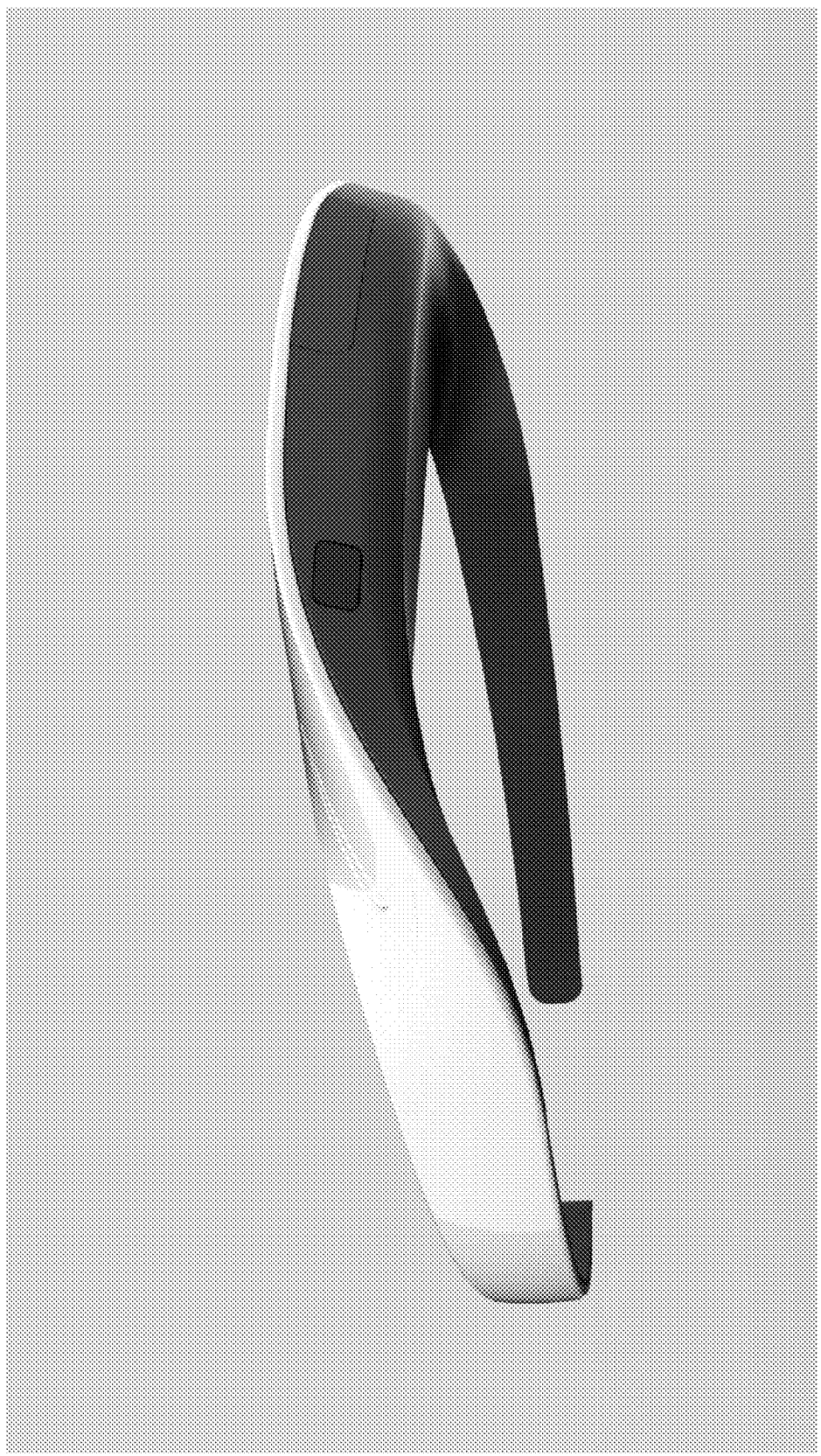
Figure 41:
Figure 42:
Figure 43B:
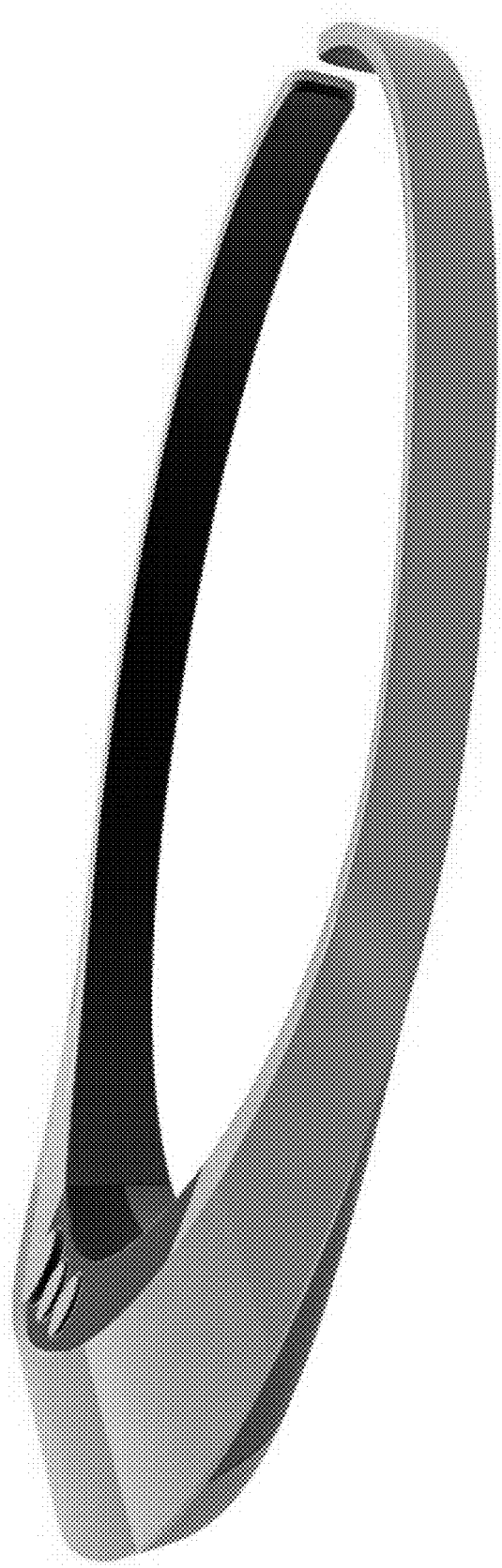
Figure 43C:
Figure 43D:
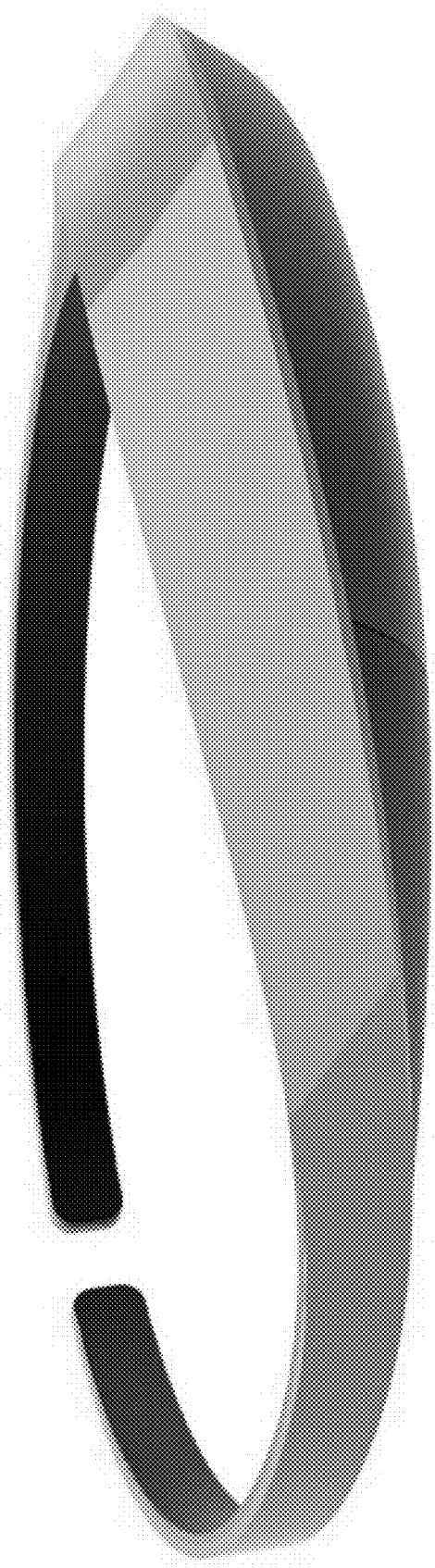
Figure 44D:
FIG. 44D is a photograph of a model wearing the video camera band shown in FIGS. 44A-C, 44E and 44F.
Figure 44E:
FIGS. 44A-C, 44E, and 44F are cross section, left side, front top left perspective, front and top views, respectively, of a video camera band according to another exemplary embodiment of the present disclosure
Figure 44F:
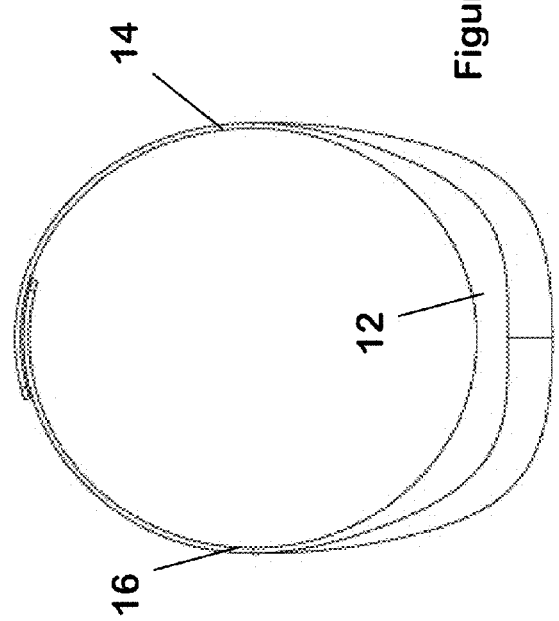
Figure 44A:
Figure 44B:
Figure 44C:
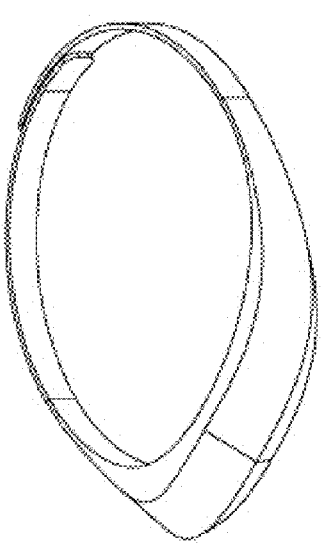
Figure 45H:
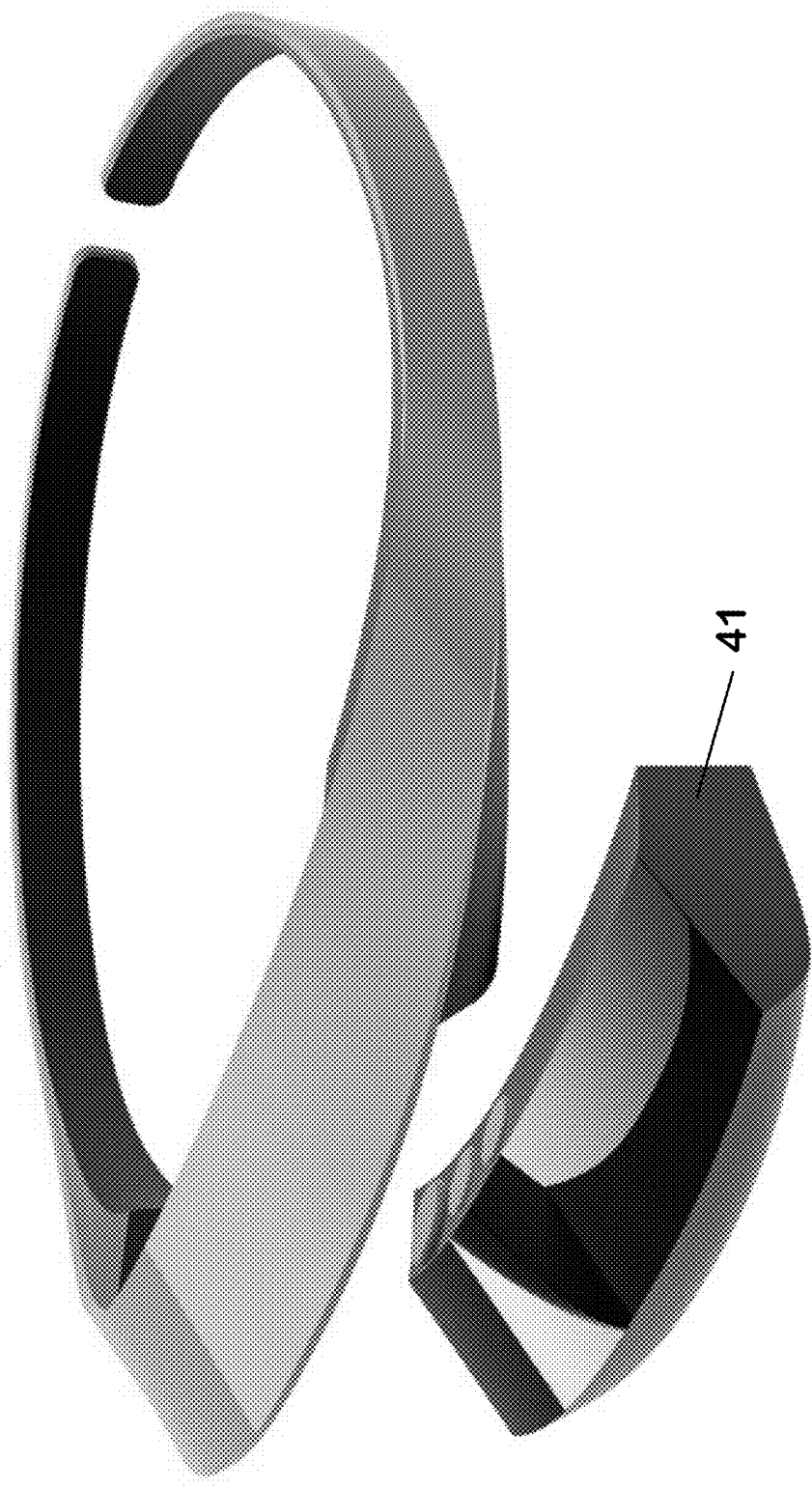
Figure 45I:
Figure 45J:
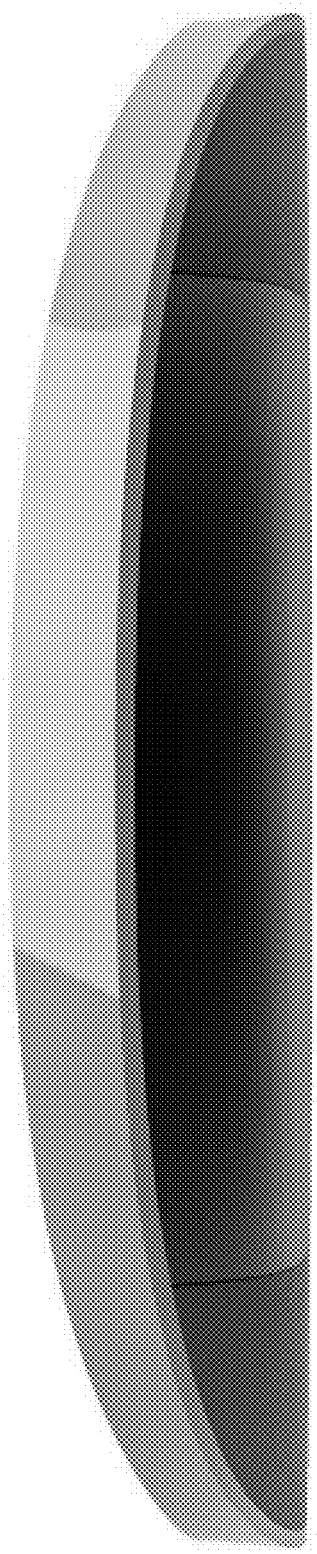

For example, as shown in FIGS. 21A and 21B, a left side portion 14 may include a removable component 40. Removable component 40 may serve any number of functions. For example, removable component 40 may include storage for storing video or other information and a data interface such as USB (Universal Serial Bus) or microUSB. In this example, the removable component 40 may be configured to allow a user to transfer video or other information from the video camera band to another device, such as a computer or television, without establishing a wireless data connection. In another example, removable component 40 may be a cover shielding a removable battery, a data or power input interface, etc.

In another example, as shown in FIGS. 45A-45I, a removable component 41 may comprise all electronic elements of the video camera band, including, for example, one or more cameras, a processor, a power source such as a battery, etc. In one example, multiple bands of different aesthetic arrangements may be provided for a user to match to their current outfit or occasion, enabling the user to purchase a single electronics unit 41 for use with any of the multiple bands. In another example, different electronics units 41 may be compatible with a single band. For example, an outdoors electronics unit which is waterproof and adapted for outdoor light conditions may be provided interchangeably with an indoor electronics unit which is particularly adapted for recording images or video in low light conditions or a magnifying electronics unit provided with software or optics for telescopically or microscopically magnifying an image or video.

The removable component 41 may include buttons 34. The band may not include any electronics, buttons or power supplies outside of the removable component or the band may include electronic components, power supply components or inputs such as buttons in addition to the components included in the removable component 41.

In addition, a video camera band may include two or more removable components 41. For example, a video camera band my include a band, a first removable component 41 including the electronic components of the video camera band such as the processor, video camera and buttons, while a second removable component may include a rechargeable battery. Electronic connections between the first and second removable components or between the band and the first and second removable components may be provided.

In still another example, a video camera band may not include left or right side portions and may instead comprise a bridge 12 configured to attach to a wearer by other means. For example a bridge 12 may be configured to attach to the brim of a wearer's hat, the top of a wearer's eyeglasses or sunglasses, the chin strap or shell of a wearer's helmet, etc. In another example, a video camera band may attach above or below a wearer's head or face. For example, a video camera band may be worn on a wearer's chest much like a necklace, as shown in FIG. 46H.

In FIGS. 2A-4C, an example of a side portion hinge 18 is shown which connects a left side portion 14 to a bridge 12. It will be recognized that a right side hinge may be similarly or differently configured. As shown, the bridge 12 and left side portion 14 are rotatably connected to one another about a hinge axis. In a pair of conventional eyeglasses, for example, analogous hinges are found between the earpieces and the outside portion of the lens frames. In the example shown in FIGS. 2A-4C, however, the hinge axis is not vertical and is not orthogonal to the length of the side portions.

In the example of FIGS. 2A-2C, with the left side portion 14 fully open relative to the bridge 12 and the major plane of the left side portion 14 is positioned approximately orthogonally to the major plane of the bridge 12. For the purposes of describing the orientation of the hinge axis, X, Y and Z directions shall be applied according to the conventional Cartesian coordinate system. As used herein, the X direction shall refer to the direction parallel to the length of the bridge, the Y direction shall refer to the direction orthogonal to the major plane of the bridge and the Z direction shall refer to the direction parallel to the length of the left and right side portions (when they are in their open positions). For further reference, Appendix I (FIGS. 28-31) further describes the geometry of an exemplary hinge design. In FIGS. 28-31, a hinge comprising a connection between objects that allows said objects to rotate relative to each other about a fixed axis is shown. Each object's length is defined as the object's largest dimension, its width is defined as the object's second largest dimension, and its thickness is defined as the object's third largest dimension. In position A, the planes along the objects' length and width are perpendicular. The axis of each object's width is perpendicular to the other objects width. In position B, the planes along the objects' length and width are at an angle less than 10°. The axis of each object's width is parallel to the other objects width.

In the hinge example shown in FIGS. 2A-4C, the hinge axis is located in a hinge plane which is rotated from the Y-Z plane by an angle of 43.75°±20° about the Y direction so that the hinge plane lies between the bridge 12 and the left side portion 14. In another example, the hinge plane is rotated from the Y-Z plane by an angle of 43.75°±10°. In yet another example, the hinge plane is rotated from the Y-Z plane by an angle of approximately 43.75°. In the hinge plane, the hinge axis is rotated from the Y direction by an angle of 50°±20° so that the hinge axis points generally downwards (towards a wearer's feet) as the hinge axis extends away from a wearer's head. In another example, the hinge axis is rotated in the hinge plane from the Y direction by an angle of 50°±10°. In yet another example, the hinge axis is rotated in the hinge plane from the Y direction by an angle of approximately 50°. In this configuration, the bridge 12 and left side portion 14 are able to rotate about the hinge axis from an open position, shown in FIGS. 2A-2C, through an intermediate position, shown in FIGS. 3A-3C, to a closed or almost closed position, shown in FIGS. 4A-4C. In the closed position, the major plane of the left side portion 14 and the major plane of the bridge 12 form an angle between them which is generally less than 10°.

In another example, side portions 14 and 16 may be to joined to the bridge 12 by hinges having hinge axes which are generally perpendicular to the Y axis.

In another example, side portions 14 and 16 may be rigidly connected to the bridge 12, without a hinged connection, as shown, for example, in FIGS. 1A-1G and 39-45. Side portions 14 and 16 may extend back from the bridge 12 and may be provided with a space between their ends opposite the bridge 12, as shown in FIG. 63E, may overlap each other, in FIG. 44F, may not be separated, and may be fused, as shown in FIG. 46E.

Figure 5B:
FIGS. 5A and 5B show perspective views of a video camera band according to another exemplary embodiment of the present disclosure.
Figure 5A:
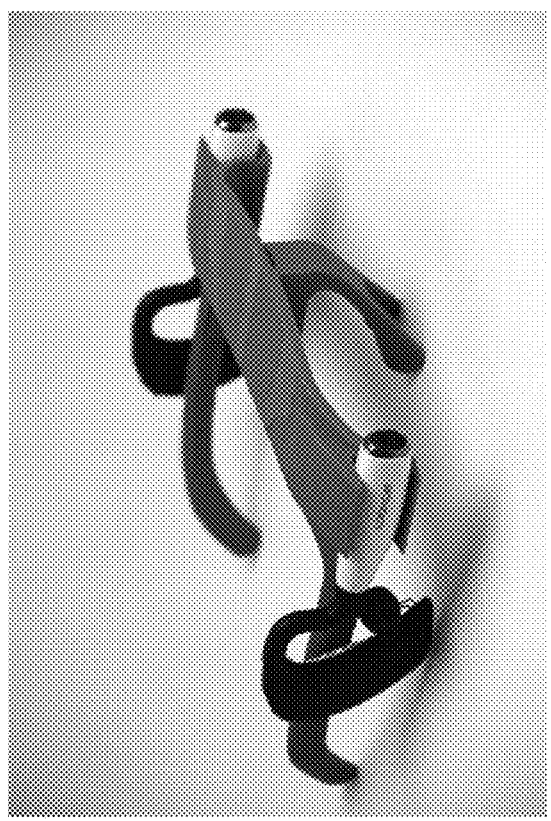
Figure 6D:
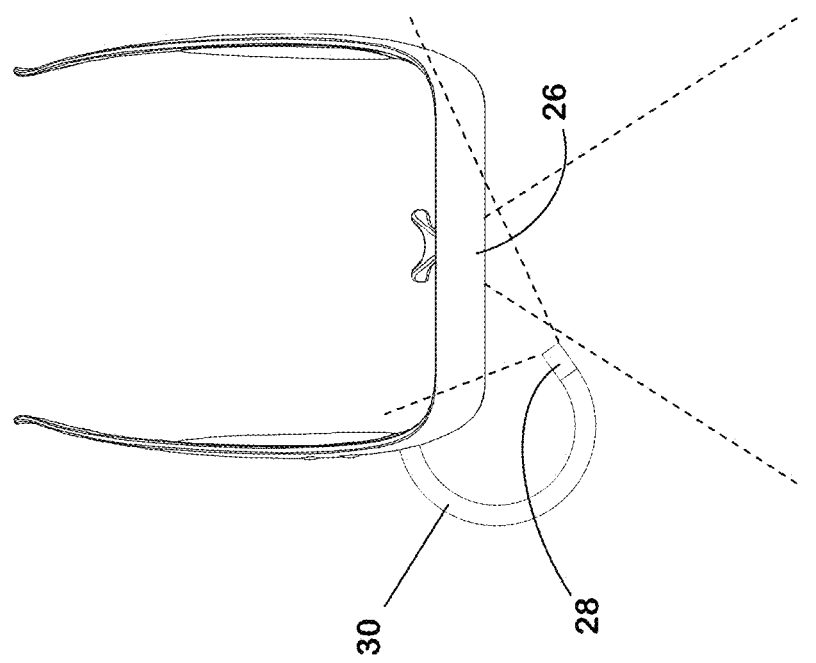

In another exemplary embodiment, shown in FIGS. 5A and 5B, a video camera band 10 may be provided with a bridge 12 and left and right portions 14 and 16 as in the above example, as well as camera clips 22 at the outer portions of the video camera band 10 for clipping one or more cameras 24 to the video camera band 10. In the example shown, the camera clips 22 are located generally on the sides of a wearer's face. The camera clips 22 may be attached to any of the left and right side portions 14 and 16 and the bridge 12. In this example, the video cameras 24 may be separate devices and may not be embedded in the video camera band 10. In this example, the video cameras 24 may be attached by wires (not shown) to a processor and other components (not shown) in the video camera band 10 or may be provided with their own processing capabilities.

The video camera band 10 may be provided with one or more video cameras. As used herein the term "video camera" shall generally refer to any sensor capable of sensing still or moving image information. The video cameras may be attached to or embedded within any component of the video camera band. For example, the video cameras may be attached to or embedded in any combination of the bridge, left or right side portions, nosepiece, etc. In the example shown in FIGS. 1A-1G, two video cameras 26L and 26R are embedded within the bridge 12.

The video cameras may be aimed in any direction, as shown in FIGS. 6A-6D. Video cameras are typically limited to a particular field of view. In FIGS. 6A-6D, the fields of view of the various cameras are shown notionally by dashed lines. In one example, shown in FIG. 6A, a single video camera 26 may be aimed in a direction generally parallel to the length of the left and right side portions. In another example, shown in FIG. 6B, a video camera band 10 is provided with two video cameras 26, both aimed in a direction generally parallel to the length of the left and right side portions 14 and 16. In yet another example, shown in FIG. 6C, a video camera band is provided with three video cameras 26 arrayed so as to capture a very wide combined field of view. In still another example, shown in FIG. 6D, a video camera band may be provided with a first video camera 26 aimed in front of a wearer and a second video camera 28 provided on a boom 30 which is aimed back at the wearer.

In another example, the field of view of any particular camera or group of cameras may be changed according to the input of a user. In one example, a user may operate a command input (such as slider 38 in FIGS. 15A and 15B, an electronic input such as a button, a software input, etc.) to mechanically change a lens location in the video camera band, effecting an optical zoom feature to broaden or narrow a field of view of a video camera. In another example, the field of view may be changed without altering a magnification level of the recorded video or image. In still another example, magnification of a recorded image or video may be effected electronically through manipulation of the originally recorded image or video through software or other means.

In yet another example, the aim of any camera or group of camera may be changed by a user. Again, a command input such as slider 38 in FIGS. 15A and 15B may control such an adjustment through mechanical means such a rack and pinion gear system, such an adjustment may be made through software or other electronic means, etc. In one example, the aim of a pair of cameras is adjusted according to the proximity of a subject to be recorded. Such adjustment may be made manually or may be made automatically by software or electronics provided in the video camera band. In one example, if a subject of focus moves closer to the wearer, the aim of a pair of cameras provided on a video camera band may be shifted towards one another. In another example, if a subject of focus moves farther away from a wearer, the aim of a pair of cameras provided on a video camera band may be shifted away from one another.

In an aspect of the present disclosure, less than all video cameras provided in a video camera band may be employed to record a particular event. For example, a video camera band may include a switch (such as slider 38 in FIGS. 15A and 15B), which may be electronically controlled, mechanically controlled (such as by a lens cover, etc.), software or configuration setting controlled or any combination of the above operable to deactivate any one or more camera during at any particular moment. For example, if a video camera band includes two video cameras, a switch may be provided to switch between "3D mode" (in which both cameras simultaneously record video) to "2D mode" (in which only one camera records video). In such an example, the camera deactivated when switching to 2D mode may be set in advance or may be changed according to a user's command. A switch or other input may be provided to allow a user to choose which of the cameras is/are deactivated at any particular moment.

When provided with two or more video cameras pointed in generally the same direction, the video camera band may be used to capture 3D video. As explained in the Description of Related Art section, conventional 3D video may be comprised of left and right 2D video. In the example shown in FIGS. 1A-1G, for example, the left video camera 26L may be configured for recording a "left 2D video" and the right video camera 26R may be configured for recording a "right 2D video." The "left 2D video" and "right 2D video" may be combined into a 3D video through the work of electronic processors either provided within the video camera band or in a separate device.

In the example shown in FIG. 1A, the spacing 32 between the left and right video cameras 26L and 26R may be chosen according to a number of different technical considerations. For example, if the goal is to provide 3D video that replicates as closely as possible the wearer's own original experience, the distance 32 between the left and right video cameras 26L and 26R may be configured according to the wearer's interocular distance (distance between the wearer's pupils). In another example, if a video camera band 10 is intended to be used primarily to record 3D video of very close subjects, especially in tight quarters (such as is described in Example D, below), the distance 32 between cameras 26L and 26R may be set narrower than a wearer's interocular distance in order to, for example, prevent obscuring the view of one of the cameras by nearby obstacles and reduce parallax problems which can occur in stereoscopic recording of close subjects. In yet another example, if a video camera band 10 is intended to be used primarily to record 3D video of faraway subjects (such as is described in Example B, below), the spacing 32 between cameras 26L and 26R may be configured to be larger than a wearer's interocular distance in order to, for example, enhance the imitated depth effect when viewing the 3D video. The spacing 32 between video cameras 26L and 26R may be fixed or the video camera band 10 may be configured to allow adjustment of the video camera spacing distance 32, for example by operation of slider 38, shown in FIGS. 15A and 15B.

Any adjustments or modifications to the camera band (such as to video camera field of view, aim, interocular distance, etc.) may be made, for example, automatically, by a command input to an input receiving feature of a video camera band (such as a button 34, a slider 38, etc.), by a command input receiving feature of a connected device (such as a smartphone, remote control, etc.), or by any other means. In addition, changes made to settings or operation of a video camera band may be reflected in video displayed in real time as it is viewed by a video camera of the video camera band. For example, as a wearer is adjusting the aim of video cameras of a video camera band, the user may watch a display of the video being recorded by their video camera band on a connected smartphone, heads-up display or remote control as adjustments are made.

The video camera band 10 may be provided with components configured for receiving, processing, storing, and/or transmitting still images and/or video information from the one or more video cameras 26. A functional block diagram of an exemplary video camera band is shown in FIG. 7. A processor 102 may be provided to receive the image and/or video information 104 from the one or more video cameras 26. The processor 102 may be a general multipurpose processor such as an ARM (Advanced RISC (Reduced Instruction Set computer) Machine) processor chip commonly found in mobile phones and other "smart" devices, a processor more specifically tailored to image and video processing such as the A5s30 processor available from Ambarella, a custom manufactured, single purpose chip, etc.

The one or more video cameras 26 may be configured to provide image information 104 in any of a number of different formats well known to those in the art. For example, the video cameras 26 may be configured to provide video information according to an MPEG (Motion Picture Experts Group) standard or any other digital video compression standard or derivation therefrom. The video cameras 106 may be configured with many resolution and frequency capabilities. In one particular example, the video cameras 106 may be capable of recording video at a resolution of up to 1920×1080 pixels at a frame rate of up to 60 Hz, with interlaced and/or progressive line scanning. In another example, video cameras 106 may be capable of recording video at a resolution of higher than 1920×1080 pixels and at a frame rate of higher than 60 Hz.

A video camera band may optionally be provided with a video input processor 108 for receiving and processing video information 104 from the one or more video cameras 106. For example, if a video camera band is provided with two cameras for recording 3D video, a video input processor 108 may be configured to receive the video information 104 from the two video cameras 26 and provide a processed video information stream 110 to the processor 102. The processed video information stream 110 may be a single stream. When combining more than one video information stream 104 into a single processed stream 110, many formats have been proposed. In one example, video may be captured by two cameras at a frequency of approximately 30 Hz and frames from the two video cameras may be alternately assembled into a processed video stream which would have a frequency of approximately 60 Hz. In another example, corresponding frames from two video cameras may be juxtaposed beside each other into a single, wide frame of a processed video information stream. One exemplary video input processor is the S3DS processor available from Ambarella.

A video camera band may also be provided with local storage 112. The local storage 112 may comprise any (one or more of) apparatus, device, composition, and the like, capable of retaining information for future use, copying, playback, transmission and the like. Some examples of local storage devices include solid state storage devices, platter-type hard drives, virtual storage media and optical storage media formats such as CDs, DVDs and BDs, etc.

In addition, a video camera band may be provided with a network interface 114 which may be configured to transmit and/or receive data (which may include video and/or audio information) to and/or from a remote server or other electronic device. As an example, a network interface 114 may be configured to communicate data according to one or more data communication protocols, such as GSM (Global System for Mobile Communications), GPRS (General Packet Radio Service), CDMA (Code Division Multiple Access), EV-DO (Evolution-Data Optimized), EDGE (Enhanced Data Rates for GSM Evolution), 3GSM, 3G, HSPA (High Speed Packet Access), HSPA+, LTE (Long Term Evolution), LGE Advanced, DECT, WiFi, Bluetooth, NFC (Near Field Communication), IR (Infra-Red), etc. As one example, a network interface 114 may be configured to communicate data with or across a cellular telephone network using an appropriate protocol to and/or from a remote internet server, for example, to upload video information and/or audio information to the remote Internet server. In another example, described in more detail below, the video camera band is configured with a network interface 114 configured to communicate with a mobile phone, smartphone or remote control through a Bluetooth communication link. Of course, a video camera band may be provided with any number or combination of network interfaces 114 configured to communicate according to any of the various communication protocols.

A video camera band may also be provided with a battery 116 and/or a power input part 118. The power input part 118 may be configured to charge a battery 116 (as shown) and/or may be configured to provide operational power to the processor 102 and/or other components. The battery 116 may be configured to be charged via inductive charging or any other form of non-direct charging. In one example, shown in FIGS. 20A and 20B, one or more ports 42 may be provided to allow a direct input of power to the video camera band. In one example, port 42 may be a micro USB port. Ports 42 may be provided anywhere on the video camera band and their locations are not particularly restricted.

A video camera band may also be provided with a variety of different input sources 120. Possible input sources 120 include data sources as well as command sources. For example, possible data sources include, without limitation, GPS (Global Positioning System) sensors, timers or clocks, acceleration sensors, position or location sensors, ambient light sensors (for image compensation processing, for example), microphones, IR sensors, magnetic or electric field sensors, optical motion sensors, biometric sensors such as pulse, blood oxygen or temperature sensors, etc. Examples of command sources include, without limitation, physical buttons which may be displaced by some small amount to register an input, touch-type inputs which register user input without noticeable displacement, for example capacitive or resistive sensors or buttons, a touch screen, other types of physical or virtual switches (such as the slide switch 38 shown in FIGS. 15A-18B, 21A and 21B), IR sensors, etc. Command sources may also include, for example, a microphone and voice translation processor or program to receive voice commands, acceleration sensors to receive movement or gesture commands such as horizontal or vertical waving or tipping motions, etc. In the example shown in FIG. 1E, for example, the video camera band is provided with two physical buttons 34 in the right side portion. In another example, inputs may take the form of a wireless data connection or physical port, such as port 42 (which may adhere to a standard specification such as USB or microUSB, for example). In another example, an external device may provide inputs to the video camera band. For example, a Nintendo Wii, Microsoft XBOX 360 or Kinect may provide position or movement information to the video camera band, a connected device such as a smartphone or remote control may provide command inputs or setting information to the video camera band, etc.

The video camera band may also be provided with a wide range of outputs 122. Possible outputs include, without limitation, LEDs (light emitting diodes), IR command or data outputs, speakers, wired data outputs such as USB (Universal Serial Bus), Mini USB, Micro USB, HDMI (High Definition Multimedia Interface), etc. For example, port 42 in FIGS. 20A and 20B may be configured as a wired data output. The video camera band may include one or more display screens as outputs capable of displaying information. Examples of types of screens possibly comprised in a video camera band include e-ink screens, LCD (Liquid Crystal Display), TFT (Thin Film Transistor), TFD (Thin Film Diode), OLED (Organic Light-Emitting Diode), ANGLED (Active-matrix organic light-emitting diode) displays, plasma displays, CRT (Cathode Ray Tube) displays, projectors, etc. Screens may also include additional functionality such as touch sensitivity. For example, the screen of the video camera band may include capacitive, resistive or some other type of touch screen technology. Generally, such touch screen technology is capable of sensing the position and sometimes even the force with which a user may touch the screen with one or more of their fingers or compatible implements.

In one example, a video camera band may be provided with a heads-up display oriented in the line of sight of one or both of a wearer's eyes. The heads-up display may be configured to display, for example, video information uploaded in real time by another video camera band wearer in close proximity, attending the same sporting event, etc. The heads-up display may or may not allow a wearer to see through the heads up display. In this way, a video camera band may provide a type of "picture-in-picture" experience to a wearer. Of course, the heads-up display may also be configured to provide easier access and control of the video camera band's various settings and network connections. In one example, a heads-up display may be paired with an eye tracking feature, allowing a wearer to input commands by simply looking at a particular portion of the heads-up display.

In another example, a video camera band may be provided with one or more headphones or earphones, examples of which are shown in FIGS. 38A-38G, allowing the user to hear audio information received through the video camera band's network interface, audio which is being captured by a microphone of the video camera band, etc. Such headphones or earphones may be provided with or without an accompanying heads-up display.

Figure 8:
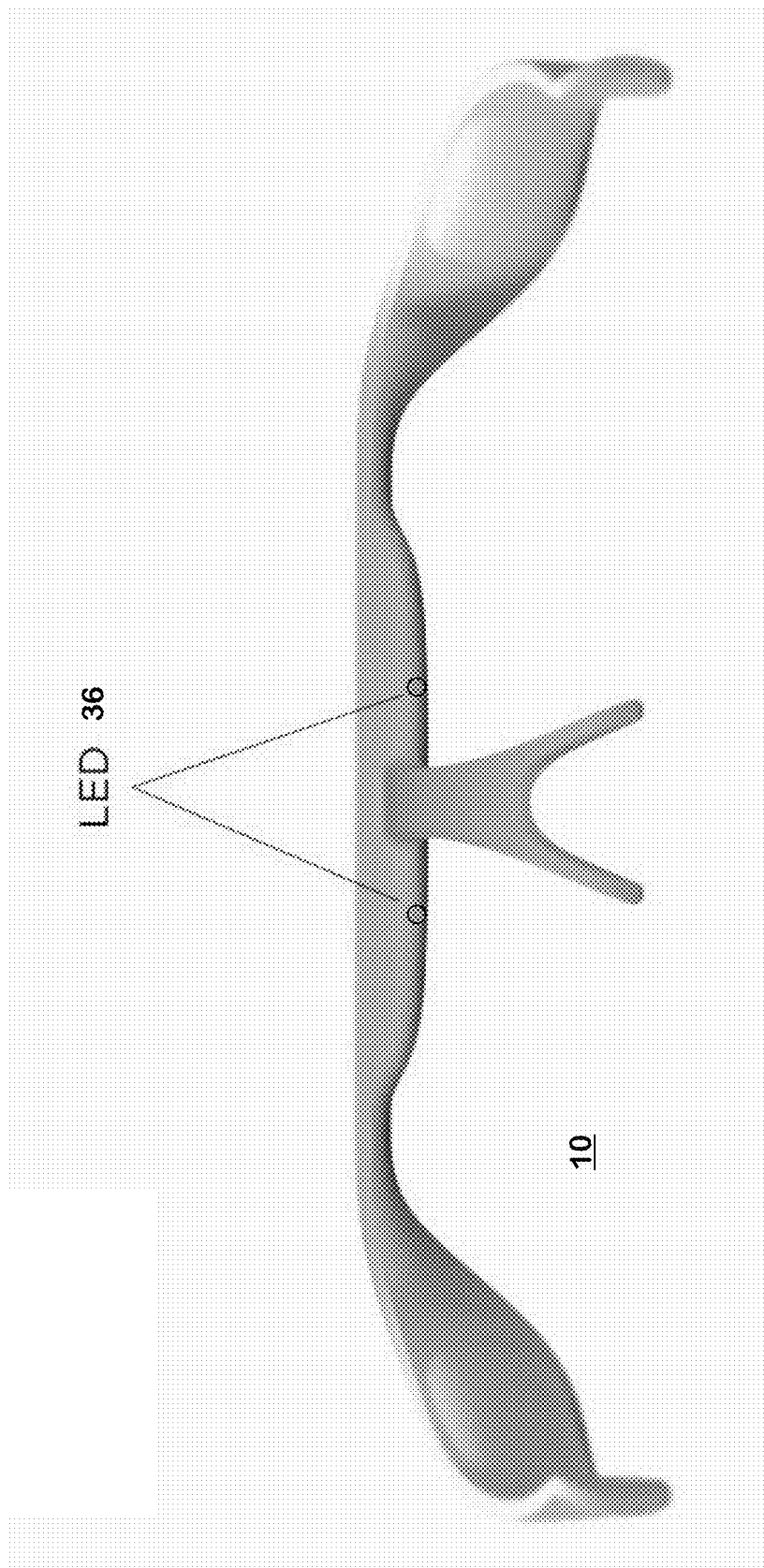
FIG. 8 shows a rear view of a video camera band according to yet another exemplary embodiment of the present disclosure.
Figure 19A:
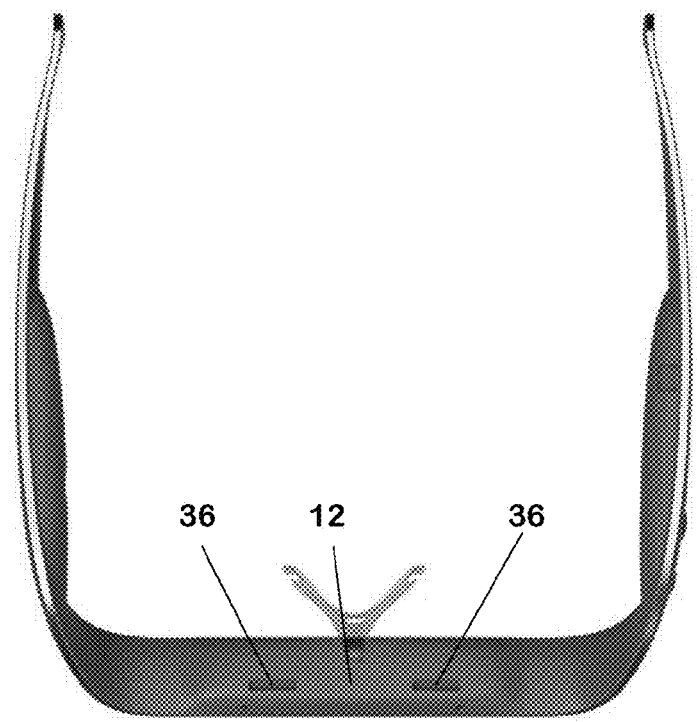
FIGS. 19A and 19B are computer renderings of a bottom view of video camera bands according to exemplary embodiments of the present disclosure.
Figure 19B:
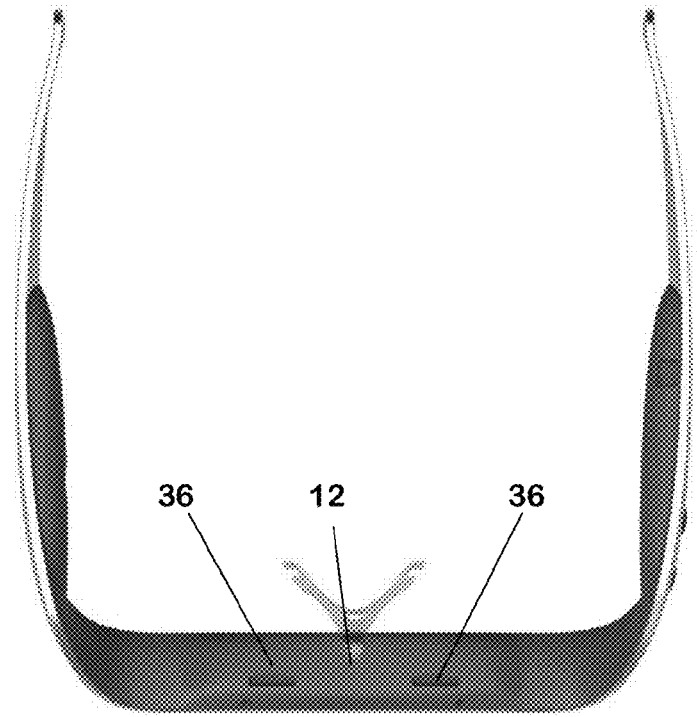
Figure 20A:
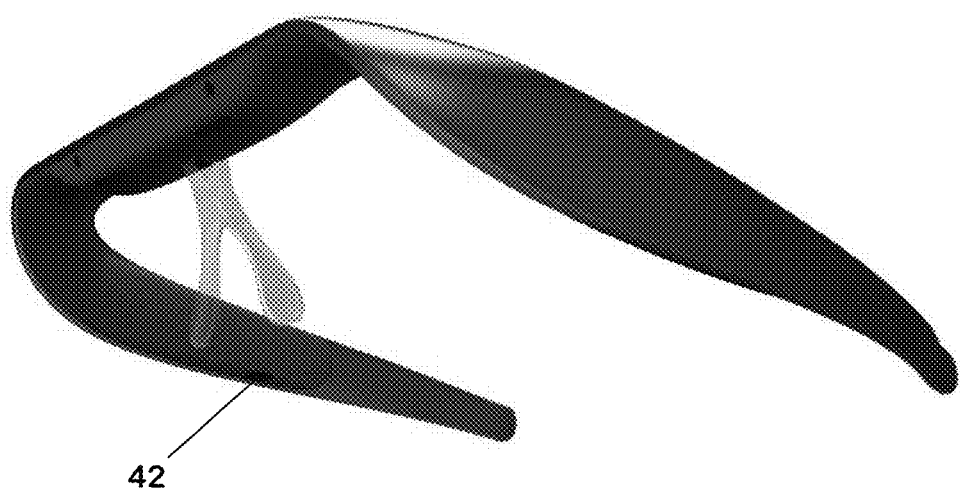
FIGS. 20A and 20B are computer renderings of a front-left-bottom perspective view of video camera bands according to exemplary embodiments of the present disclosure.
Figure 20B:
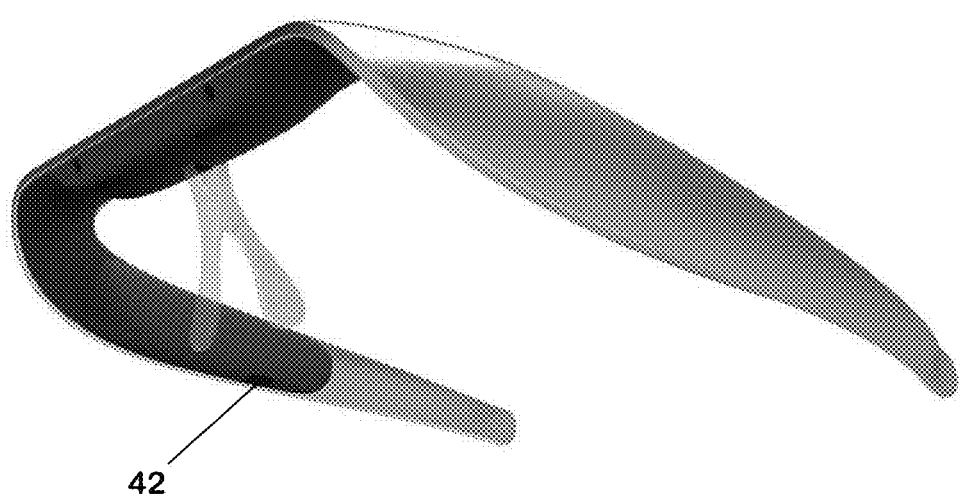

In one example, shown in FIG. 8, the video camera band 10 is provided with one or more visual indicators 36 (LEDs, for example) which face in the direction of the wearer's forehead. Such indicators 36 may be configured to indicate by, for example, their illumination or illumination pattern (an on/off blinking interval, for example) the On/Off status of the video camera band, the current mode of the video camera band (shooting, standby, etc.), the presence of a data connection to an external device, etc. FIGS. 19A and 19B show more examples of illuminated indicators 36. As shown in FIGS. 19A and 19B, the illuminated indicators 36 may take a generally rectangular form and may be located on an underside of the bridge 12. In another example, one or more indicators may be provided in a heads-up display, examples of which are discussed above.

It will be appreciated that any of the components described herein as being provided in the video camera band may be bundled with other components into one or more combined components. For example, a "single chip" processor may be provided which may comprise, in whole or in part, the processor 102, local storage 112 and network interface 114 shown in FIG. 7. As another example, a video input processor 108 may be combined with some local storage 112 in a single component.

Figure 9:
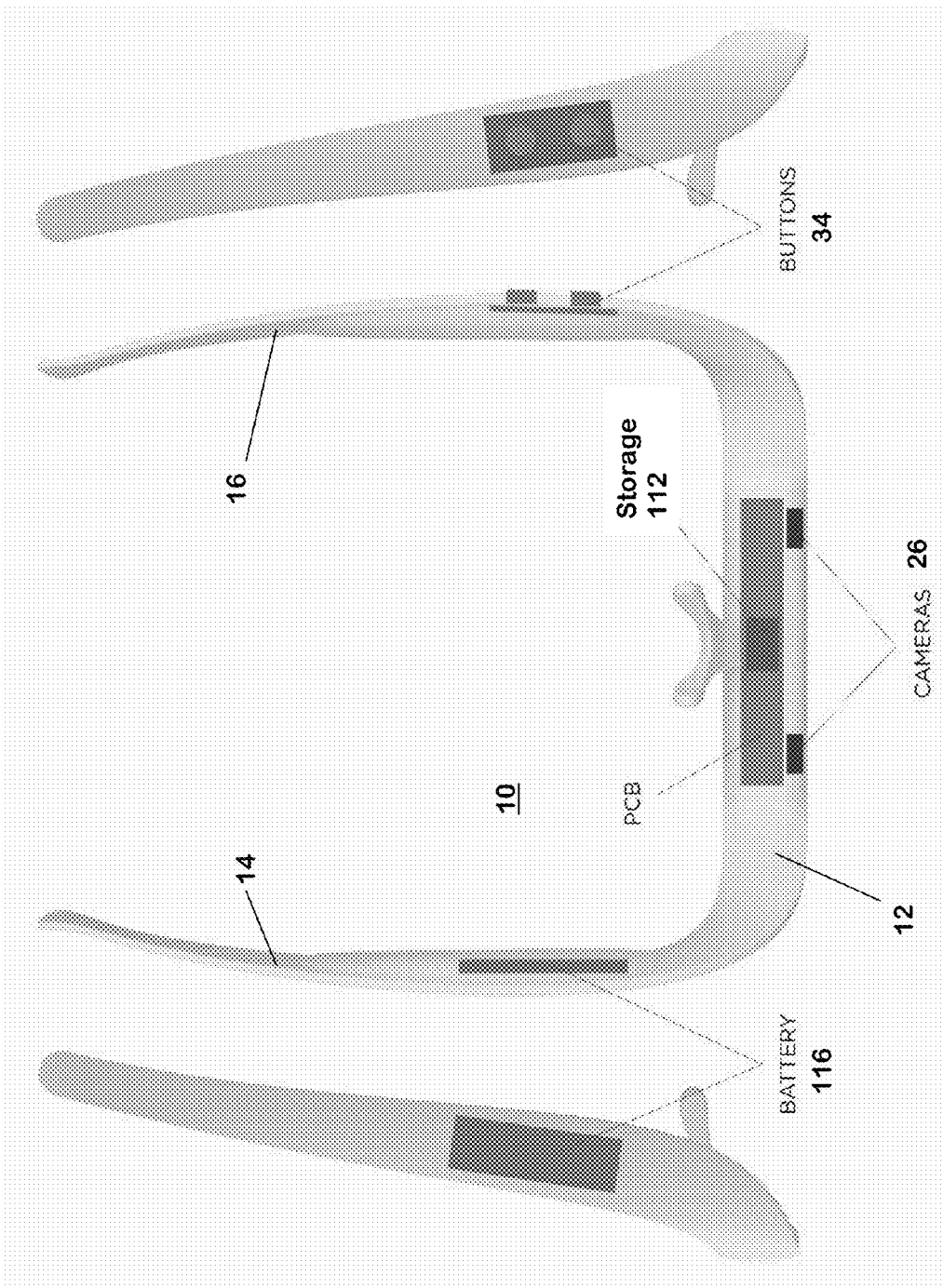
FIGS. 9A-9C show notional left, bottom and right views (which include partial cutaways to show internal components), respectively of a video camera band according to still another exemplary embodiment of the present disclosure.

The various electronic components of the video camera band may be consolidated in a single location within the video camera band or may be distributed throughout. For example, as shown in FIGS. 9A-9C, a video camera band may be provided a battery 116 in the left side portion 14, buttons 34 in the right side portion 16 and the remainder of components (some or all assembled on a PCB (Printed Circuit Board)), including the processor 102, video cameras 26, network interface 114, local storage 112, etc. in the bridge 12. Other examples of component arrangement within a video camera band are shown in FIGS. 32, 33A-33C and 37A-37D.

The components of the video camera band are preferably optimized for weight and size reduction and are preferably distributed in the video camera band so as to impart a relatively equal size and weight balance to the video camera band in all directions, such as in the example shown in FIGS. 9A-9C. As another example, components such as the battery or processor may be located in the side portions near a wearer's temples or in the side portions behind a wearer's ears.

Now, the function of the video camera band will be described. As described above, video (or still images) may be captured in a wide range of formats and resolutions. Such formats and/or resolutions may be set by a user ahead of time or may not be changeable by a user. As one example of a way to allow users to change settings of the camera band, an app (application) installed on a smartphone or computer may provide a way to build a camera band configuration file which contains information related to the various user changeable settings. Once compiled by the user, the configuration file may be uploaded to the video camera band via a communication link to a local storage of the video camera band. The communication link may be wired (such as USB) or wireless (such as a cellular network data connection, WiFi, NFC or Bluetooth). For example, a user may choose to record or transmit video in 2D or 3D, in high resolution or low resolution, and with a microphone turned on or off. Network interface options may also be set by a user. For example, a user may be provided with the choice for the video camera band to communicate with external devices via Bluetooth, WiFi, NFC and/or 3G or 4G cellular communication.

The user may also be provided with the option to determine how the recorded video is transmitted and/or stored. For example, the user may be provided with the option for the video to be stored either on the video camera band or on a nearby mobile device through a connection such as Bluetooth, NFC or WiFi. The video camera band may also be configured to automatically upload the video to a remote server through a network, such as through a wireless cellular data connection. Different resolutions and types (2D, 3D, audio on or off, video format, etc.) of video may be independently stored and/or transmitted.

In one example, the video camera band may be configured (either automatically, for example, based on a bandwidth of a data connection or manually) to first upload a lower bandwidth compressed video stream or file to a remote location, followed by a higher bandwidth compressed video stream or file. In this example, the video information is uploaded quickly so as to take advantage of its timeliness, but the detail of the higher bandwidth video is also uploaded so as to preserve the information provided by that detail. In this example, a single video stream or file may be compressed according to different compression procedures to obtain the low bandwidth and high bandwidth video streams or files. In another example, a first video camera may be configured to record video at a lower bandwidth and a second video camera may be configured to simultaneously record video at a higher bandwidth. Video from the first, lower bandwidth camera may be uploaded before video from the second, higher bandwidth camera. The higher bandwidth video may uploaded beginning after upload of the lower bandwidth video data is completed or upload of the higher bandwidth video may begin before upload of the lower bandwidth video is completed.

In another example, the lower bandwidth video may be transmitted via a different network or means than the higher bandwidth video. For example, the low bandwidth video may be transmitted immediately via a 3G wireless cellular data connection and the higher bandwidth video may be transmitted later via a USB wired connection.

In another example, a video camera band may be configured to record all video information captured by a video camera included therein to a buffer memory, regardless of whether an instruction to record the video has been received or not. In this example, the video camera band may include a retroactive record user input (such as a button 34) configured to transfer from the buffer memory to a more permanent memory a previous amount of video recorded to the buffer.

The retroactive record user input may also be configured to divert live video information from a video camera to the more permanent memory. The amount of live video stored in the more permanent memory may not be set in advance (the live video may be recorded until a contrary commend is received) or the live video for a predetermined amount of time may be stored to the more permanent storage. In this example, if an event occurs which a user would like to more permanently story video, such as a great play during a baseball game, but they were not actively recording the video, they may still retroactively record the video captured of the event even though they did not realize before the event occurred that they would like to retain a recording of the event. If a retroactive record command is not received, the video information in the buffer memory may be overwritten after a period of time, depending of the size of the buffer memory, for example, in the case that the buffer memory is configured as a FIFO (first-in, first-out) memory.

In another example, a period record user input may be provided which may be configured to, when actuated by the user, store a predetermined amount of future video information captured by a video camera to storage. The predetermined amount may be configured by time (i.e. a predetermined number of seconds) or may be configured by data amount (i.e. a predetermined number of megabytes). This feature may be provided independently of a retroactive record user input.

In one example, the video camera band 10 is provided with two buttons 34, as shown in FIG. 9C. In one example, one button 34 is configured to turn the video camera band 10 on or off. In this example, the other button 34 may be configured to cycle the video camera band 10 between shooting mode and standby mode. In shooting mode, the video 104 from the video camera(s) 26 is processed by the processor 102 and stored and/or transmitted according to the configuration settings.

In another example a mobile device, computer or other viewing device such as a television may be connected to the video camera band through, for example, a Bluetooth connection. In this example the connected device may be used to control the function of the video camera band directly. For example, an app installed on a connected device may be configured to allow configuration of the video camera band in real time, including the destination of any video captured and processed by the video camera band.

Figure 10:
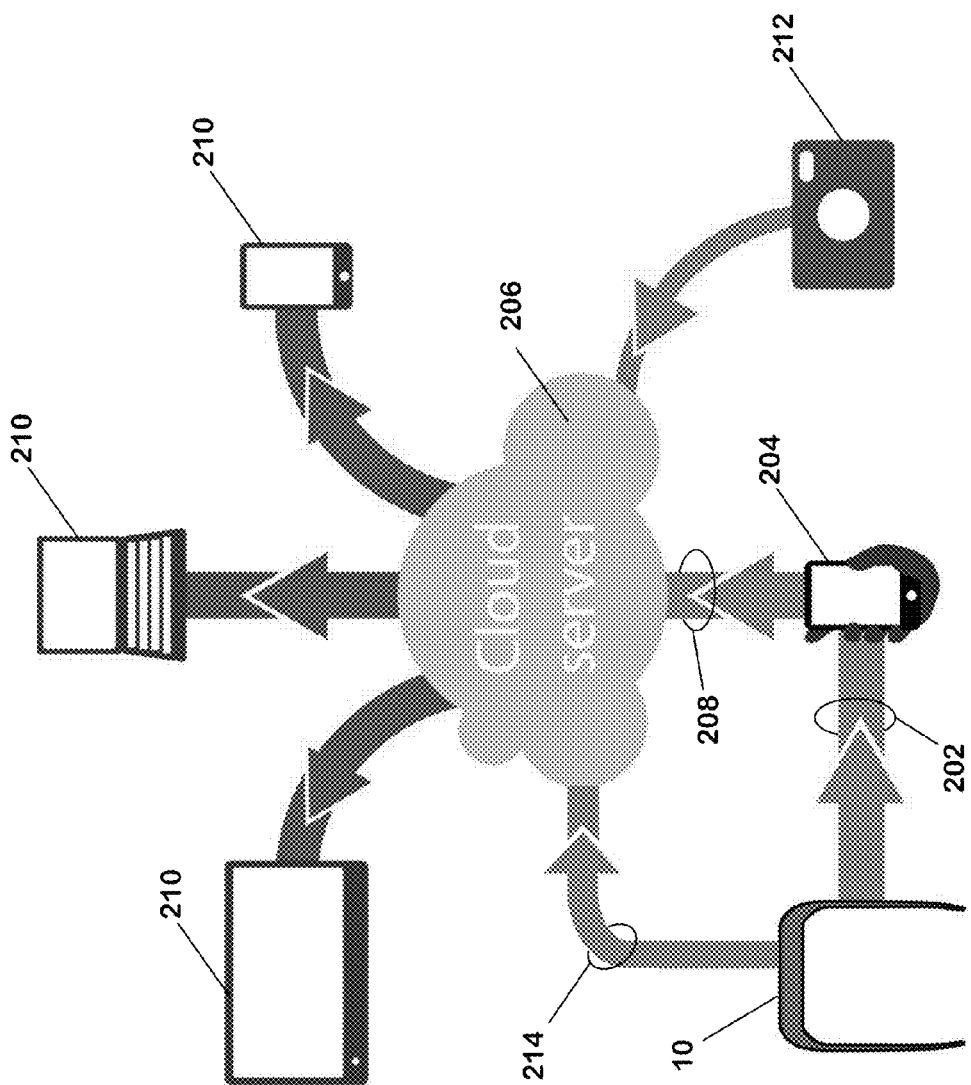
FIG. 10 shows a notional view of an information distribution system according to an exemplary embodiment of the present disclosure.

A connected device may also be used to provide the video camera band with an internet connection through tethering, as shown in FIG. 10. In this example, the video camera band 10 may only be provided with a network interface capable of connection to a device in relatively close proximity via Bluetooth, WiFi, NFC or other protocol for short-range communication 202. However, a connected device, such as a mobile device 204, may be configured to connect both to the video camera device 10 via Bluetooth 202, for example, as well as a remote cloud server 206 through a 3G or 4G cellular or similar data communication link 208, for example. In this example, the video data from the video camera band 10 is sent via Bluetooth 202 from the video camera band 10 to the mobile device 204 and from the mobile device 204 to the remote server 206. In another example, a video camera band 10 may be configured to connect directly with a server such as cloud server 206 through a direct communication link 214, which may be, for example, a 3G cellular or similar data communication link similar to 3G cellular data communication link 208.

The video camera band 10 may be configured to store additional information or send additional information to external devices in addition to, or in lieu of the video information. For example, the video information sent from the video camera band 10 to a mobile device 204 may include, in addition to any video and audio information, GPS information from a GPS sensor in the video camera band, time and date data from a clock in the video camera band, acceleration and/or position data from acceleration and/or position sensors in the video camera band, etc. Such additional information may be processed by the processor 102 or 108 of the video camera band 10 or may be transmitted to other devices for further processing elsewhere.

In an aspect of the present disclosure, video and other information may be uploaded to a remote server for further processing or downloading by other users. As used herein, the term "remote server" generally refers to any one or more network connected devices configured to receive and transmit video and other information to and from users. For example, a "cloud server" may be provided which may not actually be a single server but is a collection of one or more servers acting together as a shared collection of storage and processing resources. Such collection of servers need not all be situated in the same geographic location and may advantageously be spread out across a large area.

As mentioned above, video and other information may be uploaded to a remote server in any number of ways. In one example shown in FIG. 10, information may be sent from the video camera band 10 to a mobile device 204 such as a smartphone and then from the mobile device 204 to a server 206, for example a cloud server. In this example, both the mobile device 204 and cloud server 206 act as remote servers. In another example, information may be sent from the video camera band 10 directly to a cloud server 206, for example via a 3G cellular data connection.

As will be discussed in more detail in the various operational examples presented below, a mobile device 204 (cell phone, smartphone, tablet computer, ebook reader, etc.), computer (laptop, desktop, gaming console, etc.), television display (plasma, LCD, CRT, OLED, etc.) may be configured with an upload application (a set of computer readable instructions tangibly embodied in a storage medium) for interacting with the video camera band and/or a specially configured website or server. The application may be configured to allow a user to upload video and other information residing on the mobile device or computer to a remote server such as a server hosting a website or a cloud server. As a part of the uploaded information, information in addition to recorded video information may be sent along with the video. Such additional information may include, for example, GPS information, time and date information, acceleration and/or position sensor information, audio information, etc. In addition, the upload application may be configured to accept user-inputted information along with the video and/or additional information. For example, the user-inputted information may include a title, a description of the events shown in an accompanying video, etc. A user may also be provided with the ability to input portions of the additional information such as time and date information corresponding to when an accompanying video was recorded.

A server application may be configured to communicate with a video camera band 10, computer or mobile device 204 to receive the uploaded video or other information. The server application may also be configured to convert the uploaded video or other information from a first format to a second format. For example, the server application may be configured to convert an uploaded video in high resolution to a low resolution version. In this example, the video or other information may become platform agnostic once uploaded to the remote server. The server may be configured to handle any conversion necessary in order for viewers to view the video or other information, no matter the type of playback device to be used. The conversion from the input format to another format may occur when the video or other information is uploaded, at some later time, or at the request of a user wishing to play back the video or other information.

In another example, the server application may be configured to piece together two or more files or streams of video or other information to create combined video or other information. For example, if two or more video camera band wearers are viewing the same subject from different perspectives, the video from each of their video camera bands may be stitched together to form a virtual 3D environment which a viewer may view from many different perspectives from one input video to another and any perspective in between (which would be computed from the stitched video information).

In another example, video from the two or more video camera bands may also be uploaded to a mesh video network site where users can dynamically choose the perspective they wish to view. In this example, the user may be able to view the different videos directly or the video network site (on a remote server) may be configured to perform the processing necessary to compute another perspective from stitched video information.

In still another example, other 2D or 3D data may be superimposed onto or immersed into 2D or 3D video information. For example, building labels may be added to a 2D or 3D video tour of a city or 3D CAD (Computer Aided Design) files of parts may be placed into a 3D video of an engine disassembly operation.

In yet another example, data may be derived, calculated, or otherwise extracted from video or other information. For example, a 3D video recording of a city walking tour may be used as the basis for calculating the relative dimensions of buildings and other objects encountered during the tour. Such information may be used to develop a separate or integrated 2D or 3D map of the town and/or buildings, for example. SLAM (Simultaneous Localization And Mapping) is one particular technology compatible with such aspects of the present disclosure. SLAM is a method of using video information to navigate in an unfamiliar space. SLAM uses sequences of images from one or more video cameras to identify fixed features and then builds a map of these fixed features and the cameras' location among them. Two key image processing techniques are applied. One is image segmentation and feature extraction. SLAM uses this to identify particular features that are known to be stationary and hence valid reference points in 3D space. Typical choices are trees in an outdoor setting or light fixtures in an indoor setting. The other technique is stereo imaging to extract depth and hence range-to-feature information. SLAM builds a map of the features in a 3D coordinate grid as it images them from different camera positions, and thereby determines its own position in that grid. The mapping and self-location process is implemented in a single Kalman filter that estimates all variables. Once SLAM has identified reference points via feature extraction, the method of positioning is similar to the previously described positioning method using laser ranges. In this case range extraction is done using stereo imaging from multiple overlapping 2D images. In one example, a floor plan of a room or building may be generated by a wearer of a video camera band simply panning their head to view the entire room or walking through the building.

In another example, a database of known geometries (such as distinctive buildings like the Eiffel Tower, Chrysler Building, Empire State Building, Willis Tower, Golden Gate Bridge, Burj Khalifa, etc.) may be referenced when processing video information to determine a wearer's precise geographic location, for example without the need for GPS. The relative size and perspective of a recognized geometry or geometries may be used to further pinpoint a wearer's location, for example. Additional information such as which cell phone towers are in range (as sensed by a compatible network interface, for example) may be used to narrow a wearer's location to a certain triangulated area.

In another example, location information (either determined by a processor from video, examples of which are described above, or received via, for example, a GPS receiver) may be interfaced in a geo-mapping or geo-fencing application. For example, a wearer's location may be tracked and a geo-fencing application may be configured to generate an alert when a wearer enters or leaves predetermined geographic area.

In another example, a download application may be configured to allow users to download or stream information from a remote server hosting a website, a cloud server, etc. to a display device 210. In this example, the application may be installed on the user's mobile device, television, computer, etc. or may be executed through a website the user accesses via their mobile device, computer, television or other internet connected device. The download application may provide users the ability to search for video information or other information according to any of the additional information or user inputted-information uploaded with the video or other information. For example, the download application may be configured to allow a user to search for videos recorded at a particular date and time, at a particular geographic location, having a particular title, etc. or an combination thereof. In addition, the download app may be configured to allow searching by attributes of the video or other information. For example, the download application may be configured to allow searching based on whether a video is recorded in 3D, the particular resolution of the video, whether the video is shot in black and white or color, etc. or any combination thereof.

Once a video or other information is selected by the user through the download application's search function, the application may be configured to serve the video or other information to the user's display device. A display device may or may not be the same device from which the user searched for and selected the video or other information. For example, a user may search for and select a video on their smartphone, but choose to stream the selected video to their 3D television in their living room. The manner of serving the video or other information is not restricted. For example, the video or other information may be downloaded all at once by a display device or may be downloaded portion by portion (streamed) and buffered accordingly as the video or other information is played back.

In addition to video already uploaded to a remote server and stored for a period of time, the upload, server and download applications may be configured to allow the live uploading and downloading of video and other information, from a video camera band to viewer in real time.

Of course, it will be apparent that the upload, download and server applications are not restricted to use with a video camera band according to the present disclose and may be compatible with a wide range of video, audio and/or other information sources capable of communicating with an external device. For example, as shown in FIG. 10, a user's digital camera 212 may be configured to upload information to a cloud server 206.

The upload, server or download applications may also be configured to insert advertising into the video or other information. Such advertising may present a possible revenue stream which could be used to subsidize or reduce to the cost to the user of enjoying the functionalities provided by the upload, server and download applications.

Operational Examples

A) "What You See is What You Get". Capture Every Moment of Your Life. Hand-Free, Effortless, Total Freedom.

Tom and Julia are having a party to celebrate their son Johnny's 10th birthday and have invited all his playmates, friends and neighbors over. Tom is excited to capture the moment. He just put on his hands-free video camera band just like wearing a pair of glasses and activates the On/Shoot button. He can capture the whole event on video without thinking about it while helping Julia to set up the table and start the grill to barbeque hamburgers and hot dogs. On this beautiful sunny afternoon he can also put on his prescription sunglasses under his video camera band without any problems. His hands are full handling all the grill work but Tom can still capture the whole event in the back yard with friends and family and Johnny's big smiling face blowing the candles and opening his new birthday present, a baseball glove, all the while serving the guests, flipping hamburgers and enjoying a beer. He captures all the conversation, jokes and happy moments effortlessly without having to occupy his hands with the video camera band.

After serving the cake, Tom uses his smartphone (which stores the video automatically downloaded from the video camera band) to play back the recorded exciting moments: the moment when Johnny first tries out his new baseball glove, to his home run, a flying ball almost hitting his cap; all in 3D action. Tom has total hand-free convenience and enjoys the whole day while getting the full two hours of happy memories on video captured effortlessly.

He can instantly play back and view the video from his smartphone app as well as stream a selected clip to a remote internet server and attach a video clip in an email to Aunt Mary in Boston. Julia can download the high resolution version of the video and share with Grandma on the new 3D TV.

B) 3D Football Event: Location Specific App

Tom is at the stadium for the College Football Bowl Final. He can use a smartphone app to launch a website and select the "College Football Bowl Final" event via the time and Geo tag.

Tom uses his video camera band to live stream the event from his video camera band to a remote server along with many other video camera band wearers at the event, and he can view others' views from different angles and locations in the stadium.

A stadium map on the website shows in real time how many people are wearing a video camera band and streaming live video and their location in the stadium.

While Tom is streaming from the south side of the field, the away team throws a long touchdown in the north side. Tom selects a close up view from one of the video camera band users with nearest angle in the far end to view the action from a better angle.

At home, Tom downloads a selected view from all the angles from other video of the game from the website by searching the location and time. He edits the highlights of the whole game and sends it to the website and texts a link to Bob, a high school friend and die-hard fan who moved to Paris last year, to view from his 3D laptop.

C) 3D Tour

Tom is planning to visit Bob in France with his whole family. Before he departs, he logs onto a website to preview some of the hot spots and plan their bike trip around the country.

When they visit the Eiffel Tower, Mary is afraid of heights and does not want to climb the tower, so Tom and Bob climb up and live stream from the top of the Tower from their video camera bands which are connected to a wireless cellular data network. Mary opens her smartphone app and is able to watch the panoramic view of Paris while having ice cream on the lawn below.

Tom and Bob rent bikes to tour the city and the whole tour is captured while Bob is explaining to Tom about all the cultural facts. Tom uploads the tape (recorded video, audio and other data) to his personal repository on the website.

While at home to collect some of the other video from his tours, Tom edits it into a total 3D tour of Paris and replays the experience for his friend back at home on his huge 3D TV screen.

D) 3D Training

Tom works for an aircraft manufacturer where he is a supervisor of maintenance and repair. He needs to teach all new hires the critical step-by-step procedure for how to repair or replace parts. Tom puts on the video camera band and documents the whole process by talking and demonstrating using all the hand tools and diagnostic equipment himself as he performs the various steps required.

He needs to get inside a very narrow space under the cockpit to show how to check an electronics enclosure, in between the landing gears, while his team watches from a laptop video streaming via a WiFi connection from Tom's video camera band. Tom needs to look around and upside down to show the critical stress line to be repair while marking the trouble spot. With the configuration of the video camera band, the band stays in place and does not impair Tom's movements.

A 3D CAD drawing of a replacement part may be added to the video in post-processing to further clarify the repair procedure for trainees.

Because the video is in 3D, the trainees are able to identify the distance the relative depth and size of the critical parts.

This hands-free talk with the video camera band is a vital device that captures all the critical details in tight areas and produces the training material at ease.

Back in the classroom, Tom edits in the CAD geometry of the complicated replacement gear part into the 3D training video to show the size and orientation and how to install the part into the tight gear system. The 3D video is now available for use in future training classes.

E) Multiple Player Interactive Game Device

Tom just got his new video camera band with a built-in motion sensor and position tracking technology that tracks every movement and position of the wearer. Tom is streaming live video from his video camera band to a large room-sized projection screen. Every action is played back to the screen with an avatar to represent the real person, Tom. The background constantly changes according to Tom's ducking, shooting and fight action in the game. A virtual reality 3D game plays in real life in the living room.

F) Social 3D Networking

Tom just got a FourSquare message that his gang is meeting at a downtown bar with an old friend who is in town. He is waiting for his wife to get home to watch his son Johnny before he heads out. Tom open his laptop app, selects the name of the bar where his friends are and the screen shows the bar scene in real time via streaming video from his friends' video camera bands. Tom joins the gang remotely via a webcam on his laptop, the video from the webcam streaming to a remote server. One of Tom's friends logs into the remote server on his smartphone app to view Tom's real time webcam stream at the bar. Finally, Tom's wife gets home and he puts on his video camera band and joins the gang at the bar.

G) 3D Real Estate Marketing

Julia is a real estate broker specializing in high-end property and would like to showcase a prime condo in the red hot Highline area to her potential buyer Ted who is in Hong Kong. While Ted has already seen some of the advertising footage that Julia sent before, Ted loves the general idea of the downtown live action and the river view, but he is uncertain about how he will feel in the neighborhood in everyday life.

Julia puts on her video camera band and calls Ted to give him the pitch by streaming live video via an app on Ted's home computer which is also connected with his huge 3D TV in his living room. She gives Ted a live narrated 3D walking tour from the Meat Packing district with all the designer stores, bars and restaurants, the gourmet Chelsea Market, etc. Julia goes up to the Highline park and walks amongst the grasses with the beautiful river views and later gives Ted a short tour around the condo building, which is complete with security cameras in the lobby. Ted asks Julia, through a microphone attached to his computer, to turn left to view the back side of the building to show the natural stone garden behind the lobby and to talk to the doorman and check the mail room. During the condo walk-through, Ted asks Julia to take a longer look at the wine cooler to make sure it is large enough for his wine collection. Later, Julia walks out onto the penthouse roof garden to capture the sunset. Ted has totally submerged himself into the 3D screen so that he feels he is already having a real NY experience, from the street action to enjoying a glass of wine in the hot tub in the rooftop garden at sunset with the city skyline around it. He wants to move in as soon as possible. Julia seals the deal the next day.

H) Police/Military Mission Control

Tim and Ted are both members of a police special forces to unit prepared to execute a search warrant on a house with potentially dangerous criminals inside. Tim and Ted both don their video camera bands and central mission control accesses the live streams from each of their video camera bands from a remote, secure server. Their video camera bands are also equipped with pulse and body temperature sensors which are monitored at central mission control. As the mission progresses, Ted is the first to locate the criminal in the house. Facial recognition software executed by the video camera band processor or by a connected server analyzes the video feed from Ted's video camera band and positively identifies the criminal they are hunting. Central mission control sees what Ted sees and relays this information along with the positive identification of the criminal to Tim through an earpiece. Meanwhile, central mission control notices Ted's elevated heartbeat and body temperature and instructs Ted to calm his nerves before making the next move. Without speaking a word, Tim moves silently to confront the criminal and Tim and Ted surprise the criminal together, lessening the chance of trouble.

I) Social Media Integration

Bob wears his video camera band everywhere he goes—to sporting events, nights out with friends, family events. He has configured his profile on a popular social media network to link to the video, audio and image feed from his video camera band. Via controls on his video camera band, he is able to easily upload video, audio or images directly to his personal page on the social media network.

For example, Bob wore his video camera band to his son's first little league game. When it was his son's turn to bat, he pressed a "record" button on his video camera band. After his son made a couple unsuccessful swings, he pressed a "stop and upload" button on his video camera band. The recorded video was then uploaded to Bob's personal page on the social media network (which is stored on one or more servers at a remote location). If Bob's data connection was slow, the video may have been uploaded as a low bandwidth video at first, followed by a higher bandwidth version later. Bob's wife Mary, who was at home, was able to view the video of her son swinging from Bob's personal page on the social media network almost instantaneously after Bob recorded it.

Later on, Bob's son made a great catch in the outfield, but Bob wasn't paying attention. As soon as he saw the ball in his son's glove, he pressed a "retroactive record and upload" button on his video camera band and the past 30 seconds of video, showing the great catch, were uploaded to his personal page on the social media network. Bob didn't have to tell anyone he missed it and the video was preserved for all his friends and family to see.

APPENDICES

The following appendices, and all references and sources cited therein, are hereby incorporated into the present disclosure in their entirety:

I. FIGS. 28-31 represent a description of an exemplary side portion hinge and its geometric configuration.

While the present disclosure has been described with reference to one or more particular embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this disclosure. In addition, elements and/or features of different illustrative and exemplary embodiments herein may be combined with each other and/or substituted for each other within the scope of this disclosure.

The subject matter depicted or described in the attached drawings and appendices is incorporated herein by reference in its entirety.

What is claimed is:

1. A video camera band configured to be worn by a user, the video camera band comprising:
   a left side portion;
   a right side portion;
   a bridge between the left side portion and right side portion configured to rest in a front-facing direction relative to the user's body;
   a user input receiver;
   a network interface configured to transmit data to and receive data from a remote computing device;
   at least one video camera;
   a local buffer;
   a local storage;
   a power source; and
   a processor configured to receive video from the at least one video camera and, absent a record command, store the received video in the local buffer, said processor being configured, upon receipt of a retroactive record command, to transfer a predetermined amount of video previously stored in said local buffer to said local storage and to transmit the stored video from the local storage to the remote computing device via the network interface at the direction of the user input receiver.

2. The video camera band of claim 1, wherein the video camera band comprises at least two video cameras included in the bridge.

3. The video camera band of claim 2, wherein:

the at least two video cameras are spaced apart on the bridge such that a left video camera is closer to the left side portion and a right video camera is closer to the right side portion and the processor is configured to combine video from the right and left video cameras into 3D video.

4. The video camera band of claim 1, wherein the user input receiver, network interface, at least one video camera, local storage, power supply and processor are included within the bridge.

5. The video camera band of claim 4, wherein at least one of the user input receiver, network interface, at least one video camera, local storage, power supply and processor are provided within a removable bridge component which is configured for removal from the bridge.

6. The video camera band of claim 1, wherein at least one of the user input receiver, network interface, at least one video camera, local storage, power supply and processor is configured for removal from the video camera band.

7. The video camera band of claim 1, wherein:

the processor is configured to process the received video to produce a first processed video of a first bandwidth and a second processed video of a second bandwidth, the second bandwidth being higher than the first bandwidth and the first and second processed videos corresponding to the received video, the processor is configured to store the first and second processed videos in the local storage, and the processor is configured to begin transmission of the first processed video via the network interface before beginning transmission of the second processed video via the network interface.

8. The video camera band of claim 1, wherein:

the left side portion is hingedly attached to the bridge, the right side portion is hingedly attached to the bridge, and the left side portion and right side portion are configured so as to be hingeable relative to the bridge between a wear configuration and a storage configuration.

9. The video camera band of claim 1, wherein:

the at least one video camera is included in the bridge, the left side portion is swivelably attached to the bridge, the right side portion is swivelably attached to the bridge, and the bridge is configured to swivel relative to the left and right side portions between a visor configuration and a necklace configuration such that the at least one video camera is oriented in the same direction when the user wears the video camera band in the visor configuration as when the user wears the video camera band in the necklace configuration.

10. The video camera band of claim 1, wherein, upon the receipt of a period record command, the processor is configured to store a predetermined amount of video received in the future in the local storage.

11. The video camera of claim 1 wherein upon receipt of said retroactive record command, the processor is also configured to store a predetermined amount of video received in the future in the local storage.

12. The video camera band of claim 1, further comprising a microphone and audio captured by the microphone is included in the video received, stored and transmitted by the processor.

13. The video camera band of claim 1, further comprising speakers provided near the user's ears to output audio received via the network interface.

14. The video camera band of claim 1, wherein the processor is configured to transmit the stored video to a social media network hosted on at least one remote server via the network interface.

15. The video camera band of claim 1, wherein the processor is configured to transmit the stored video to a mobile phone via the network interface.

* * * * *